United States Patent
Chen et al.

(10) Patent No.: US 12,231,041 B2
(45) Date of Patent: Feb. 18, 2025

(54) SYSTEM AND METHOD FOR MODULAR HIGH VOLTAGE CONVERSION RATIO POWER CONVERTER

(71) Applicants: The Trustees of Princeton University, Princeton, NJ (US); Google LLC, Mountain View, CA (US)

(72) Inventors: Minjie Chen, Princeton, NJ (US); Shuai Jiang, Mountain View, CA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 50 days.

(21) Appl. No.: 17/600,380

(22) PCT Filed: Apr. 3, 2020

(86) PCT No.: PCT/US2020/026601
§ 371 (c)(1),
(2) Date: Sep. 30, 2021

(87) PCT Pub. No.: WO2020/206270
PCT Pub. Date: Oct. 8, 2020

(65) Prior Publication Data
US 2022/0166314 A1 May 26, 2022

Related U.S. Application Data

(60) Provisional application No. 62/829,355, filed on Apr. 4, 2019.

(51) Int. Cl.
| | | |
|---|---|---|
| H02M 1/00 | (2007.01) | |
| H02M 3/07 | (2006.01) | |
| H02M 3/158 | (2006.01) | |

(52) U.S. Cl.
CPC .......... H02M 3/072 (2021.05); H02M 1/007 (2021.05); H02M 1/0074 (2021.05);
(Continued)

(58) Field of Classification Search
CPC ............... H02M 1/007; H02M 1/0074; H02M 3/07–078; H02M 3/155–1588
See application file for complete search history.

(56) References Cited

U.S. PATENT DOCUMENTS

| | | |
|---|---|---|
| 8,212,541 B2 | 7/2012 | Perreault et al. |
| 8,693,224 B1 | 4/2014 | Giuliano |
| (Continued) | | |

OTHER PUBLICATIONS

Sheony, et al., "A 5 MHz, 12V, 10 A, Monolithically Integrated Two-Phase Series Capacitor Buck Converter", IEEE Applied Power Electronics, Conference and Exposition (APEC), Long Beach, CA, pp. 66-72, 2016.
(Continued)

*Primary Examiner* — Peter M Novak
(74) *Attorney, Agent, or Firm* — MEAGHER EMANUEL LAKS GOLDBERG & LIAO, LLP

(57) ABSTRACT

According to various embodiments, a power converter circuit is disclosed. The power converter circuit includes a plurality of voltage splitting units (VSUs) coupled to a plurality of current splitting units (CSUs). The VSUs are connected to each other in series and the CSUs are connected to each other in parallel. The VSUs each have a fixed voltage conversion ratio and are operated at a lower frequency than the CSUs. The CSUs each have an adjustable voltage conversion ratio and are operated at a higher frequency than the VSUs.

30 Claims, 40 Drawing Sheets

(52) U.S. Cl.
CPC ....... *H02M 1/0095* (2021.05); *H02M 3/1586* (2021.05); *H02M 1/0058* (2021.05)

(56) References Cited

U.S. PATENT DOCUMENTS

| | | | |
|---|---|---|---|
| 8,724,353 | B1 | 5/2014 | Giuliano et al. |
| 8,817,501 | B1 | 8/2014 | Low et al. |
| 9,755,537 | B2* | 9/2017 | Kolar ................... H02M 7/49 |
| 9,917,517 | B1 | 3/2018 | Jiang et al. |
| 11,005,366 | B2* | 5/2021 | Huang ................. H02M 3/158 |
| 2002/0136029 | A1 | 9/2002 | Ledenev et al. |
| 2007/0296383 | A1 | 12/2007 | Xu et al. |
| 2009/0295462 | A1 | 12/2009 | Itoh |
| 2010/0117593 | A1* | 5/2010 | Piccard ................ H02J 7/0018 320/104 |
| 2013/0214750 | A1 | 8/2013 | Deboy |
| 2015/0251542 | A1* | 9/2015 | Mensah-Brown ...... B60L 50/40 307/10.1 |
| 2015/0357912 | A1* | 12/2015 | Perreault ........... H02M 3/33569 363/126 |
| 2016/0190943 | A1 | 6/2016 | Chen et al. |
| 2019/0312514 | A1* | 10/2019 | Hukel ................... H02M 3/07 |

OTHER PUBLICATIONS

Li et al., "A 98.55% Efficiency Switched-Tank Converter for Data Center Application," IEEE Transactions on Industry Applications, vol. 54, No. 6, pp. 6205-6222, Nov./Dec. 2018.

Nishijima et al., "Analysis of Double Step-Down Two-Phase Buck Converter for VRM," International Telecommunications Conference (INTELEC), Berlin, pp. 497, 2005.

Baek et al., "LEGO-PoL: A 93.1% 54V-1.5V 300A Merged-Two-Stage Hybrid Converter with a Linear Extend-able Group Operated Point-of-Load (LEGO-PoL) Architecture," IEEE Workshop on Control and Modeling of Power Electronics (COMPEL), Toronto, ON, 2019.

Pilawa-Podgurski et al., "Merged two-stage power converter architecture with soft charging switched-capacitor energy transfer," IEEE Power Electronics Specialists Conference, Rhodes, 2008.

Xie et al., "Multiphase Control for Robust and Complete Soft-charging Operation of Dual Inductor Hybrid Converter," IEEE Applied Power Electronics Conference and Exposition (APEC), Anaheim, CA, USA, pp. 1-5., 2019.

Jiang et al., "Switched Tank Converters," IEEE Transactions on Power Electronics, vol. 34, No. 6, pp. 5048-5062, Jun. 2019.

Baek et al., "Vertical Stacked LEGO-PoL CPU Voltage Regulator", IEEE Transactions on Power Electronics: Regular Paper, pp. 1-17, 2021.

International Search Report for corresponding PCT Application No. PCT/US2020/026601, dated Jul. 16, 2020.

* cited by examiner

Square Wave VSU
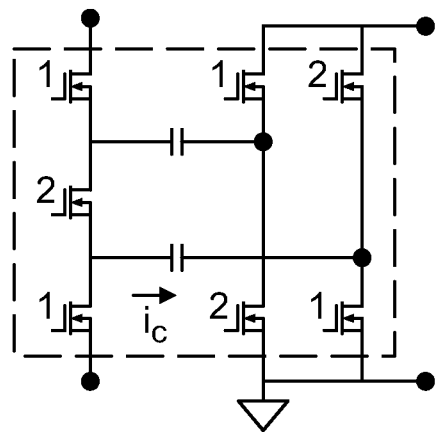
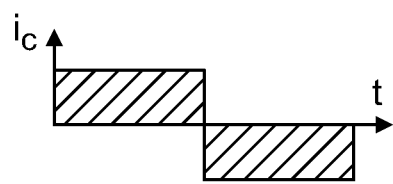
Sine Wave VSU
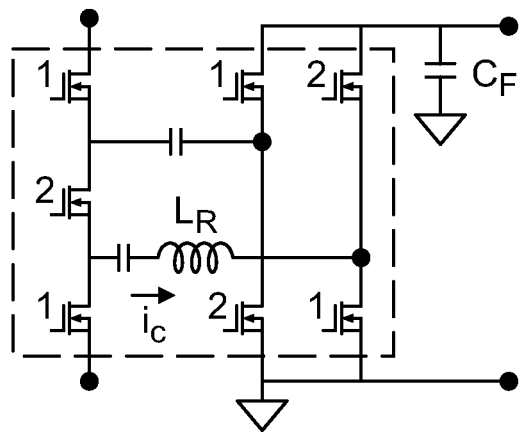
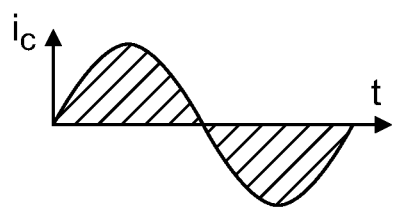
FIG. 9

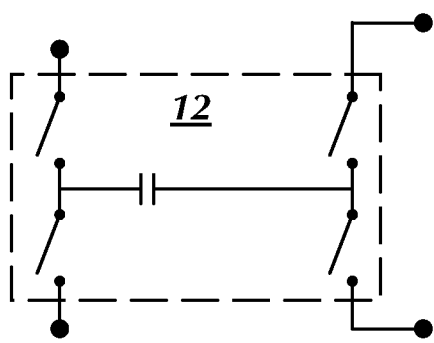
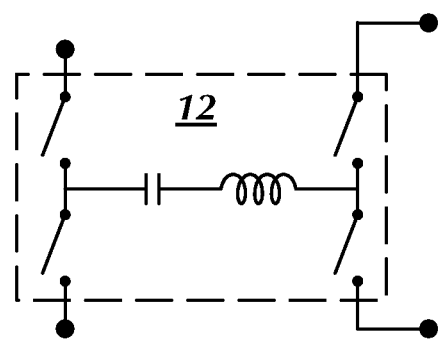
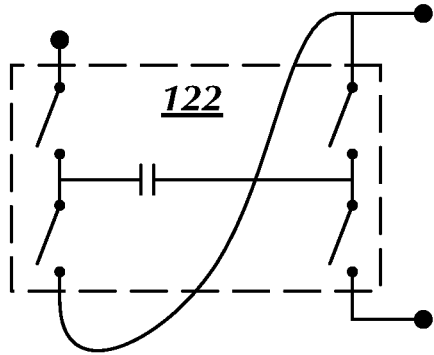
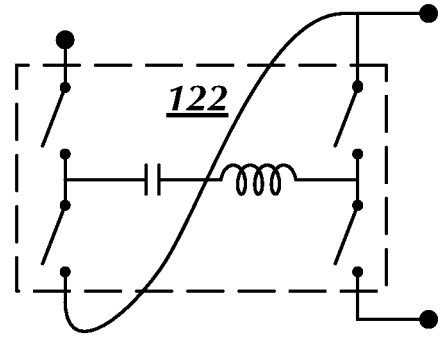
FIG. 16(a)　　　　　　　　　FIG. 16(b)

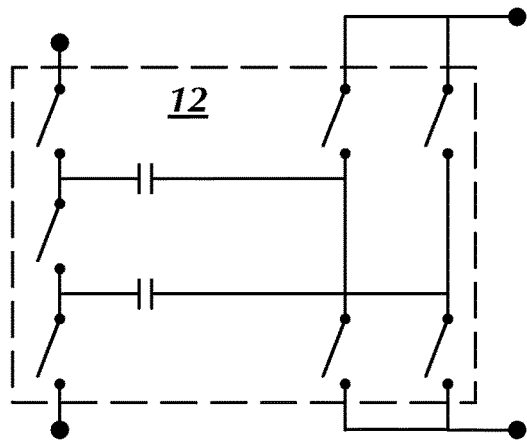
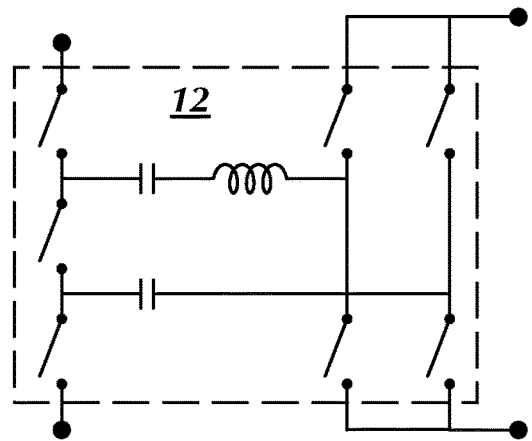
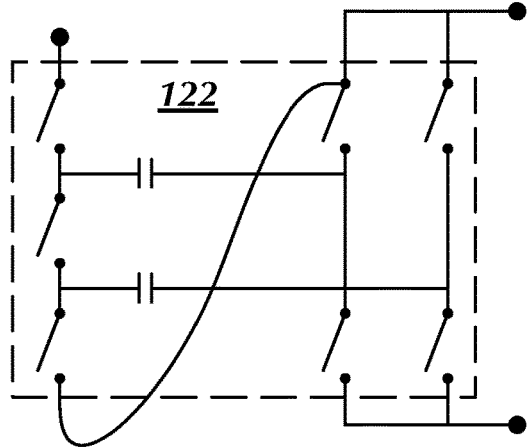
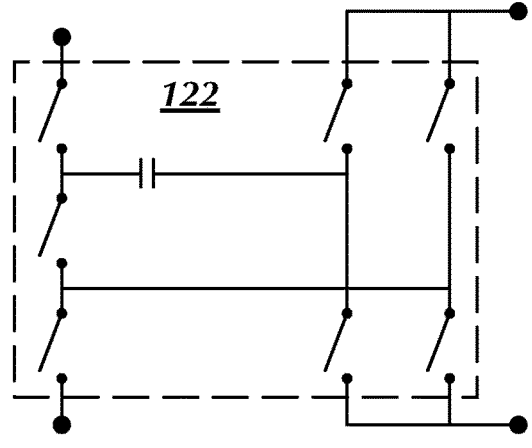
*FIG. 16(c)*                    *FIG. 16(d)*

| Topology | Single Stage Series Capacitor Multiphase Buck | Single Stage Switched Capacitor Multiphase Buck | Two-Stage Switched Tank & Multiphase Buck | Merged-Two-Stage Switched Tank & Multiphase Buck |
|---|---|---|---|---|
| Frequency | Single Frequency | Single Frequency | Dual Frequency | Dual Frequency |
| Soft Charging | Yes | Conditioned | Yes | Yes |
| Magnetics | Buck-Only | Buck-Only | Resonant & Buck | Buck-Only |
| Charging Current | Narrow Pulse | Narrow Pulse | Sinusoidal Wave | Square Wave |
| ZCS | No | No | Yes | Yes |
| Extendability | Limited Phase | Limited Phase | Unlimited Phase | Unlimited Phase |
| Bandwidth | Limited | Limited | High | High |

FIG. 21

| $Q_1$ & $Q_6$ | BSZ013N2LS (25V, 1.3mΩ) |
|---|---|
| $Q_2$ - $Q_5$ | BSZ0501NS1 (30V, 2.0mΩ) |
| $Q_{S1}$ - $Q_{S10}$ | BSZ013N2LS (25V, 1.3mΩ) |
| $C_{F1}$ - $C_{F5}$ | 45μF, 1210, X7R, Murata |
| $Q_H$ & $Q_L$ | SiC632 (DrMOS, 24V, 50A) |
| $L_1$ - $L_{12}$ | 1.0μH (HC1-1R0-R, 1.23mΩ) |
| Digital Controller | TMS320F28069 |

*FIG. 27*

SYSTEM AND METHOD FOR MODULAR HIGH VOLTAGE CONVERSION RATIO POWER CONVERTER

CROSS-REFERENCE TO RELATED APPLICATIONS

This application claims priority to provisional applications 62/829,355, filed Apr. 4, 2019, which is herein incorporated by reference in its entirety.

FIELD OF THE INVENTION

The present invention relates generally to power converters and, more particularly, to a system and method for a modular high voltage conversion ratio power converter having a plurality of voltage splitting units and a plurality of current splitting units.

BACKGROUND OF THE INVENTION

The advent of general-purpose and energy efficient computing has resulted in a need for DC/DC converters with low output voltage (<2V), high current (>100 A), and high voltage conversion ratio (>10:1). Power converters that can provide a low voltage output (<2 V) regulated at high bandwidth, while drawing energy from a higher, wide-ranging input voltage (e.g., typically between 40V to 60V) are particularly useful for supporting high performance microprocessors and telecom loads. The size, cost, and performance advantages of integration make it desirable to construct a modular and miniaturized DC/DC converter that can be easily scaled for a variety of applications.

One common approach is the use of a switched-mode power converter in which energy is transferred from the converter input to output with the help of inductors or coupled inductors. Such magnetics-based topologies include synchronous buck converters, interleaved synchronous buck converters, three-level buck converters. These power converter types can efficiently provide a regulated output from a variable input voltage with high-bandwidth control of the output. However, these converters do not fit applications with high input voltage because the switches of the buck converter must handle both high voltage stress and high current stress. Since the inductors must block high voltages, the sizes of these inductors are also usually large. Increasing the operation frequency can reduce the component size and increase the control bandwidth. The hard-switching operation of these converters limit the efficiency and power density that can be achieved, let alone the packaging constraints.

The extended duty ratio multi-phase buck and the multi-phase cascaded buck converters improves the efficiency and enhances transient response. For low voltage, high current applications, the number of required phases of these converters becomes very high, limiting the power density and efficiency. Another solution is to construct transformer-based, isolated high voltage conversion ratio topologies. However, isolation is usually not required, and transformer-based converters usually suffer low control bandwidth due to the inherent resonant behavior. In isolated topologies, the semiconductor switches are usually rated for the maximum voltage stress in the power conversion system. These high-voltage blocking devices suffer high on-state resistance or large footprints. The transformers in these architectures also usually need to handle high flux while carry high current, placing challenges on efficiency, power density, and dynamic performance.

An emerging approach for low-voltage electronics is the use of switched capacitor (SC) based DC/DC converters. This family of converters is well-suited for high density designs. An SC circuit includes a network of switches and capacitors, where the switches are turned on and off periodically to cycle the network through different operation states. There are a few limitations of SC DC/DC converters. One major limitation is the relatively poor output voltage regulation in the presence of varying input voltage or load. The efficiency of SC converters drops quickly as the conversion ratio differs from the optimal ratio. One solution to partially address this limitation is to cascade a SC converter having a fixed step-down ratio with a linear regulator or with a low-frequency switching power converter having a wide input voltage range. Another approach that has been employed is to use a SC topology that can provide multiple specific conversion ratios and select the operating mode that gives the output voltage that is closest to the desired output. However, none of these approaches are satisfactory in achieving the desired levels of efficiency and power density for future point-of-load applications with high current and high bandwidth requirements.

As such, it is desirable to construct a power conversion architecture that decouples the challenges of voltage conversion, voltage regulation, and the resistive loss of the high current path.

SUMMARY OF THE INVENTION

According to various embodiments, a power converter circuit is disclosed. The power converter circuit includes a plurality of voltage splitting units (VSUs) coupled to a plurality of current splitting units (CSUs). The VSUs are connected to each other in series and the CSUs are connected to each other in parallel. The VSUs each have a fixed voltage conversion ratio and are operated at a lower frequency than the CSUs. The CSUs each have an adjustable voltage conversion ratio and are operated at a higher frequency than the VSUs.

According to various embodiments, a method of operating a power converter circuit is disclosed. The power converter circuit includes a plurality of voltage splitting units (VSUs) coupled to a plurality of current splitting units (CSUs). The plurality of VSUs are coupled to each other in series and the plurality of CSUs are coupled to each other in parallel. The method includes controlling the VSUs to each have a fixed voltage conversion ratio and to operate at a lower frequency than the CSUs. The method further includes controlling the CSUs to each have an adjustable voltage conversion ratio and to operate at a higher frequency than the VSUs.

According to various embodiments, a power converter circuit is disclosed. The power converter circuit includes a plurality of voltage splitting units (VSUs) coupled to a plurality of current splitting units (CSUs). The VSUs are connected to each other in series and the CSUs are connected to each other in parallel. The power converter circuit further includes a controller configured to control the VSUs to each have a fixed voltage conversion ratio and to operate the VSUs at a lower frequency than the CSUs, and control the CSUs to each have an adjustable voltage conversion ratio and to operate the CSUs at a higher frequency than the VSUs.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 9 depicts a schematic diagram and graph of a 2:1 square wave VSU and 2:1 sine wave VSU according to an embodiment of the present invention;

FIG. 16(a) depicts a schematic diagram of a VSU where a capacitor branch is bypassed according to an embodiment of the present invention;

FIG. 16(b) depicts a schematic diagram of a VSU where a capacitor branch is bypassed according to an embodiment of the present invention;

FIG. 16(c) depicts a schematic diagram of a VSU where a capacitor branch is bypassed according to an embodiment of the present invention;

FIG. 16(d) depicts a schematic diagram of a VSU where a capacitor branch is bypassed according to an embodiment of the present invention;

FIG. 21 depicts a table of comparisons between hybrid switched-capacitor PoL topologies according to an embodiment of the present invention;

FIG. 27 depicts a table of components for the LEGO-PoL prototype according to an embodiment of the present invention;

DETAILED DESCRIPTION OF THE INVENTION

Generally disclosed herein is a system and method for a power converter that can provide high efficiency and high-power density for voltage regulators with high voltage conversion ratios. The architecture of the power converter can be configured as step-up converters which reduce the voltage or step-down converters which increase the voltage. The circuit includes a plurality of voltage splitting units (VSUs) and a plurality of current splitting units (CSUs). The VSUs split the voltage domains and are connected in series. The CSUs split the current domains and are connected in parallel. These VSUs and CSUs are configured in a unique and scalable way to create mutual advantages. The power converter achieves high performance over a wide operation range while offering a high voltage conversion ratio and fast dynamic response. The converter can be used to supply electricity to low voltage, high current microprocessors in data centers, as a nonlimiting example.

Figure 1:
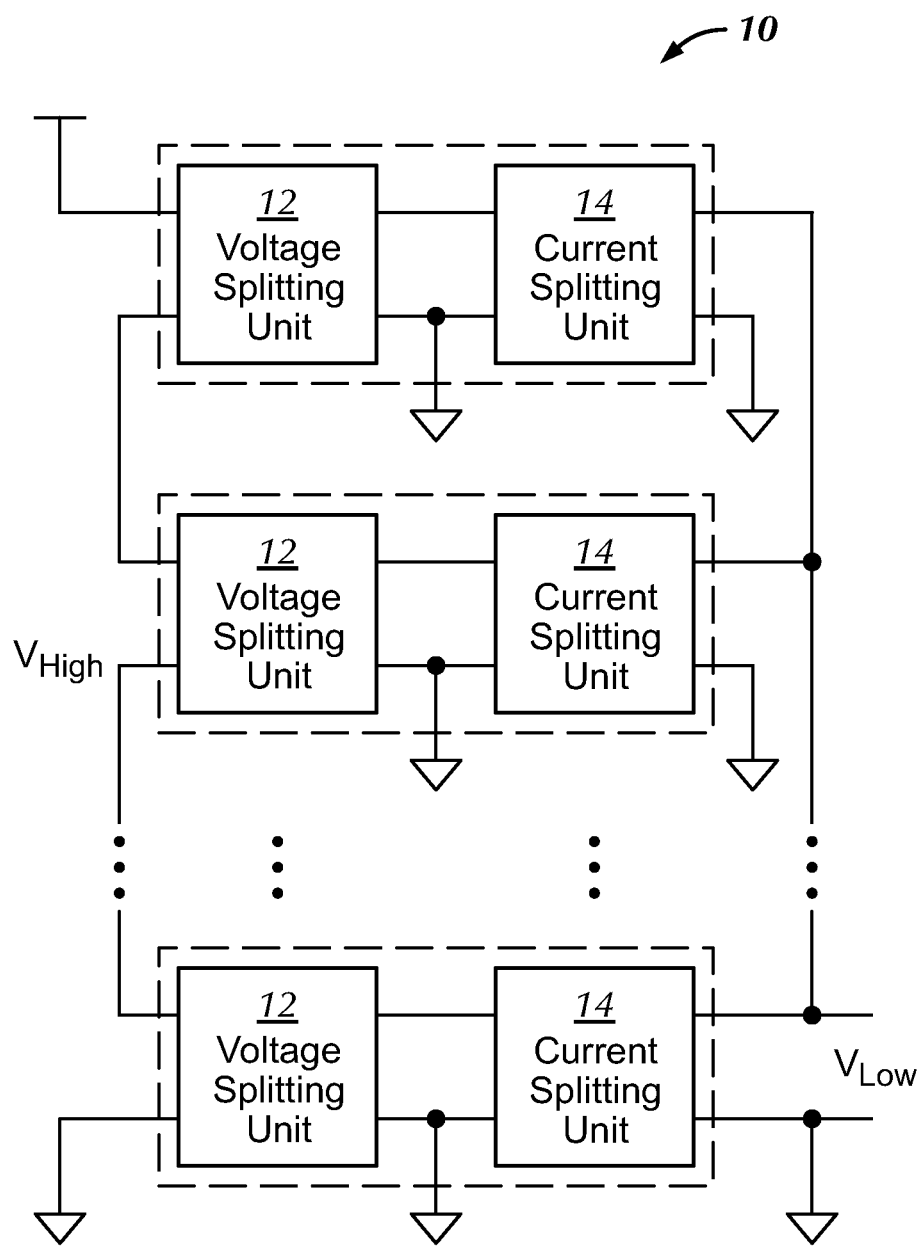
FIG. 1 depicts a block diagram of a high conversion ratio power converter according to an embodiment of the present invention.

Embodiments of the disclosed power conversion architecture combine the strengths of switched capacitor circuits in high efficiency and high power-density, and the strengths of switched inductor circuits in offering high control bandwidth and carry high current. As illustrated in the circuit 10 in FIG. 1, the high voltage is divided into multiple stacked voltage domains by a plurality of voltage splitting units (VSUs) 12 (which each function as a switched-capacitor or switched-tank circuit), and the high current is divided into multiple parallel current paths by a plurality of current splitting units (CSUs) 14 (which each function as a switched inductor circuit). In this configuration, the semiconductor devices that need to block high voltage do not need to carry high current, and the semiconductor devices that need to carry high current do not need to block high voltage.

The described stackable voltage regulator modular architecture 10 includes a plurality of modular VSUs 12 that function as switched-capacitor or switched tank circuits, a plurality of modular CSUs 14 that function as switched-inductor circuits. They are merged together in a unique way to create mutual advantages. Many VSUs 12 are connected in series on the high voltage side to divide the high voltage; many CSUs 14 are connected in parallel on the high current side to divide the high current; The VSUs 12 and CSUs 14 are coupled together with capacitors. In some embodiments, the circuit 10 converts input voltages to output voltages which are lower than the input voltages. In other embodiments, the circuit 10 converts input voltages to output voltages which are higher than the input voltages. In some embodiments, the circuit 10 can achieve high performance over a wide input or output voltage range. In other embodiments, the circuit 10 is designed for one specific input or output voltage with narrow variation. This type of converter is particularly suitable to power microprocessors with low voltage (e.g., 0.5V-1.8V) from higher voltage levels with wide variation (e.g., 40V-60V). This type of converter could also be used to power digital circuits with dynamic voltage scaling, or for supplying power to low power internet-of-things devices, where wide output voltage ranges are needed.

Figure 2:
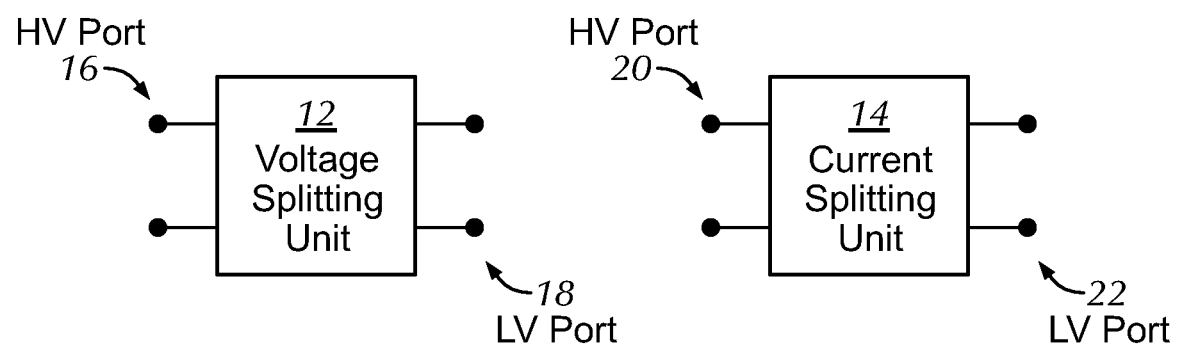
FIG. 2 depicts a block diagram of a voltage splitting unit (VSU) and a current splitting unit (CSU) according to an embodiment of the present invention.

The VSUs 12 and CSUs 14 can be constructed as a number of different circuits depending on the embodiment. As illustrated in FIG. 2 (and in greater detail in FIGS. 3(a)-4(d)), the VSU 12 is a two-port (high port 16 and low port 18) circuit network including a plurality of switches, a plurality of capacitors, and no more than one inductor. The CSU 14 is a two-port (high port 20 and low port 22) circuit network comprising a plurality of switches, a plurality of inductors, and no more than two capacitors. The VSU 12 operates similar to a switched capacitor or a switched tank circuit, and the CSU 14 operates similar to a switched inductor circuit (e.g., buck, SEPIC, or buck-boost converter). Depending on the switch implementation, power can flow unidirectionally or bidirectionally between the high port 16, 20 and low port 18, 22.

Figure 3A:
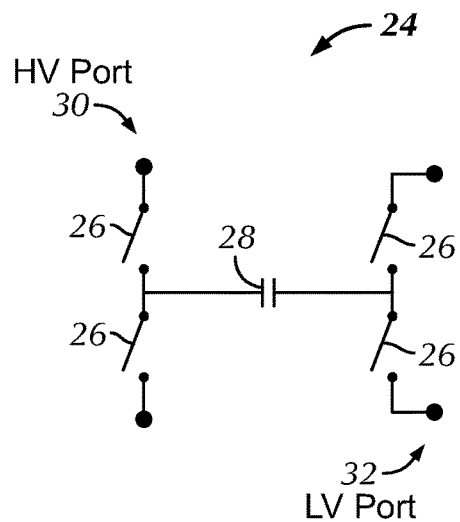
FIG. 3(a) depicts a schematic diagram of a 1:1 switched capacitor VSU according to an embodiment of the present invention.
Figure 3B:
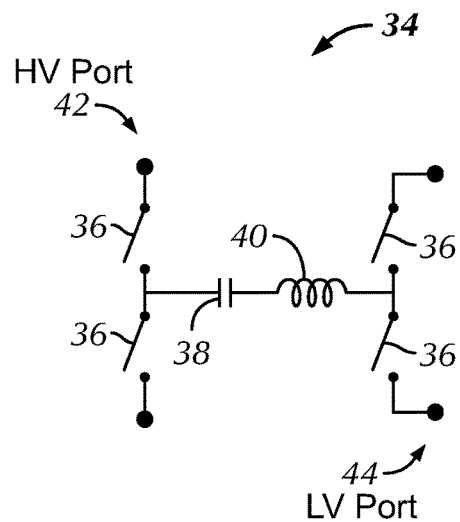
FIG. 3(b) depicts a schematic diagram of a 1:1 switched tank VSU according to an embodiment of the present invention.
Figure 3C:
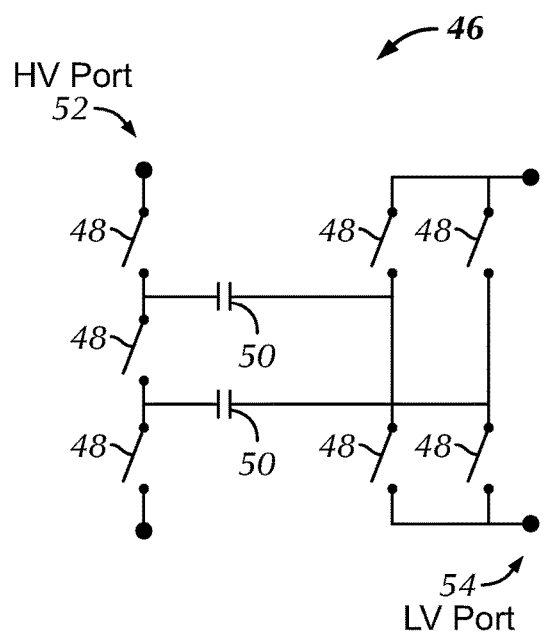
FIG. 3(c) depicts a schematic diagram of a 2:1 switched capacitor VSU according to an embodiment of the present invention.
Figure 3D:
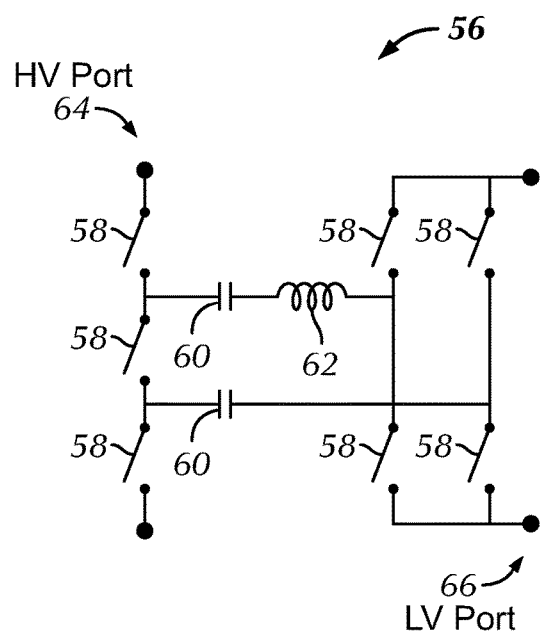
FIG. 3(d) depicts a schematic diagram of a 2:1 switched tank VSU according to an embodiment of the present invention.

FIGS. 3(a)-(d) depict nonlimiting example embodiments of the VSUs 12. FIG. 3(a) depicts a 1:1 switched capacitor unit 24 including four switches 26 and one capacitor 28. The voltage across the HV port 30 and the voltage across the LV port 32 are equivalent or approximately the same. FIG. 3(b) depicts a 1:1 switched tank unit 34 including four switches 36, one capacitor 38, and one inductor 40. The voltage across the HV port 42 and the voltage across the LV port 44 are equivalent or approximately the same. FIG. 3(c) is a 2:1 switched capacitor unit 46 including seven switches 48 and two capacitors 50. The voltage across the HV port 52 and the voltage across the LV port 54 are approximately 2:1. FIG. 3(d) is a 2:1 switched tank unit 56 including seven switches 58, two capacitors 60, and one inductor 62. The voltage across the HV port 64 and the voltage across the LV port 66 are approximately 2:1. Each switch can be implemented as a single MOSFET, a plurality of series-stacked or parallel-connected MOSFETs, or GaNFETs, as nonlimiting examples.

Figure 4A:
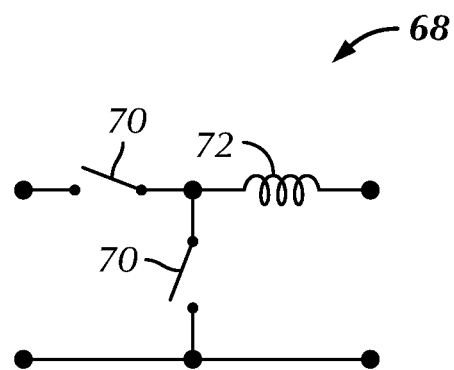
FIG. 4(a) depicts a schematic diagram of a buck CSU according to an embodiment of the present invention.
Figure 4B:
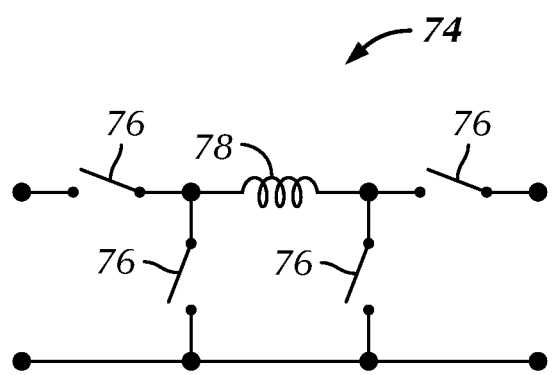
FIG. 4(b) depicts a schematic diagram of a buck/boost CSU according to an embodiment of the present invention.
Figure 4C:
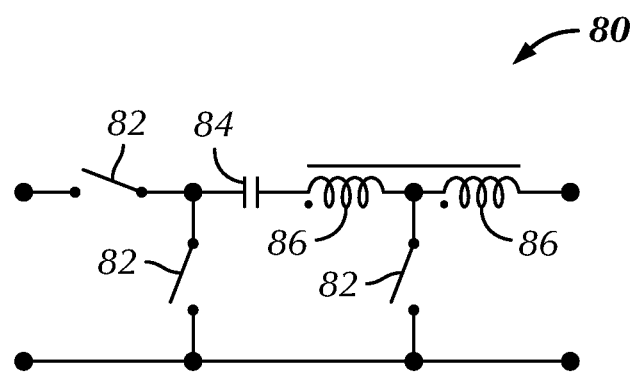
FIG. 4(c) depicts a schematic diagram of a tapped-inductor derived CSU according to an embodiment of the present invention.
Figure 4D:
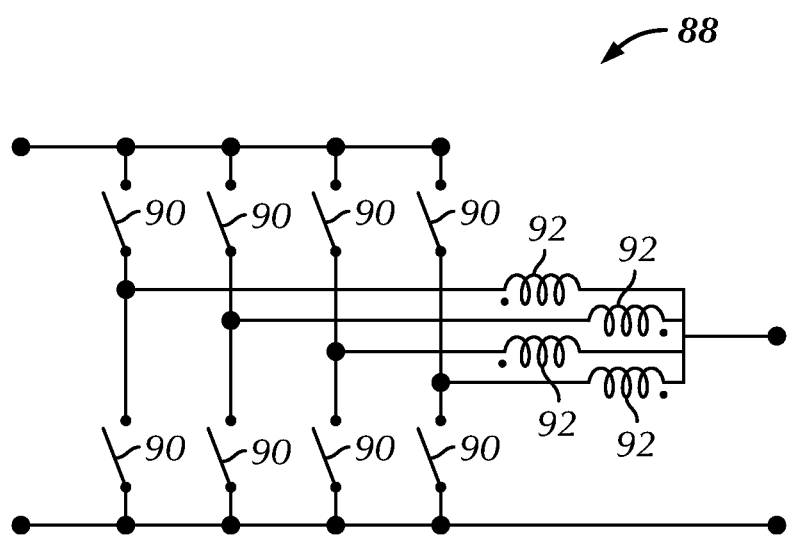
FIG. 4(d) depicts a schematic diagram of a multiphase buck CSU according to an embodiment of the present invention.

FIGS. 4(a)-(d) depict nonlimiting example embodiments of the CSUs 14. Each of the CSUs 14 can be considered as a standalone DC/DC converter. FIG. 4(a) depicts a buck unit 68 including two switches 70 and an inductor 72. FIG. 4(b) depicts a buck/boost converter 74 including four switches 76 and an inductor 78. FIG. 4(c) depicts a tapped-inductor derived converter 80 including three switches 82, a capacitor 84, and two magnetically coupled inductors 86. FIG. 4(d) depicts a multiphase coupled-inductor buck converter 88 including eight switches 90 and four inductors 92, the four inductors being magnetically coupled together.

Figure 5:
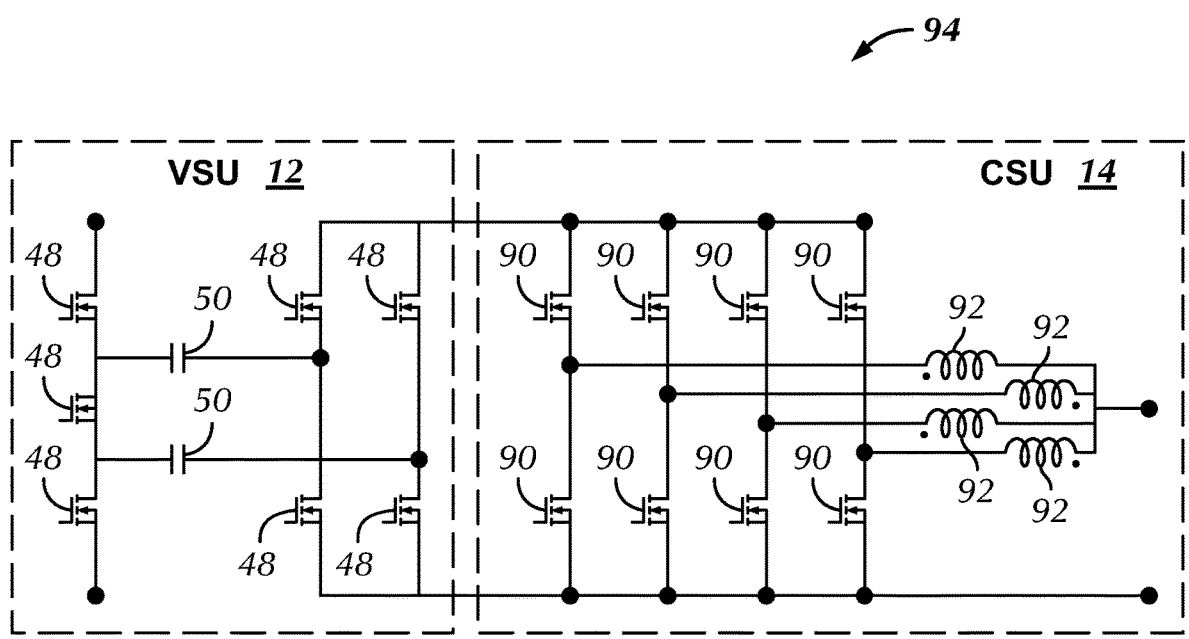
FIG. 5 depicts a schematic diagram of a submodule according to an embodiment of the present invention.

The current splitting function of the CSU 14 is realized by the way the VSUs 12 and the CSUs 14 are merged together. One VSU 12 and one CSU 14 are merged as one submodule 94 which blocks a portion of the high voltage on the HV side, and carries a portion of the high current on the LV side. FIG. 5 shows a nonlimiting example submodule 94 with a 2:1 switched capacitor unit as the VSU 12, and a 4-phase coupled inductor buck converter as the CSU 14. With the VSU 12 operating as a switched capacitor circuit and the CSU 14 operating as a 4:1 buck converter, this submodule 94 can provide a voltage conversion ratio of 8:1 or higher.

Figure 6:
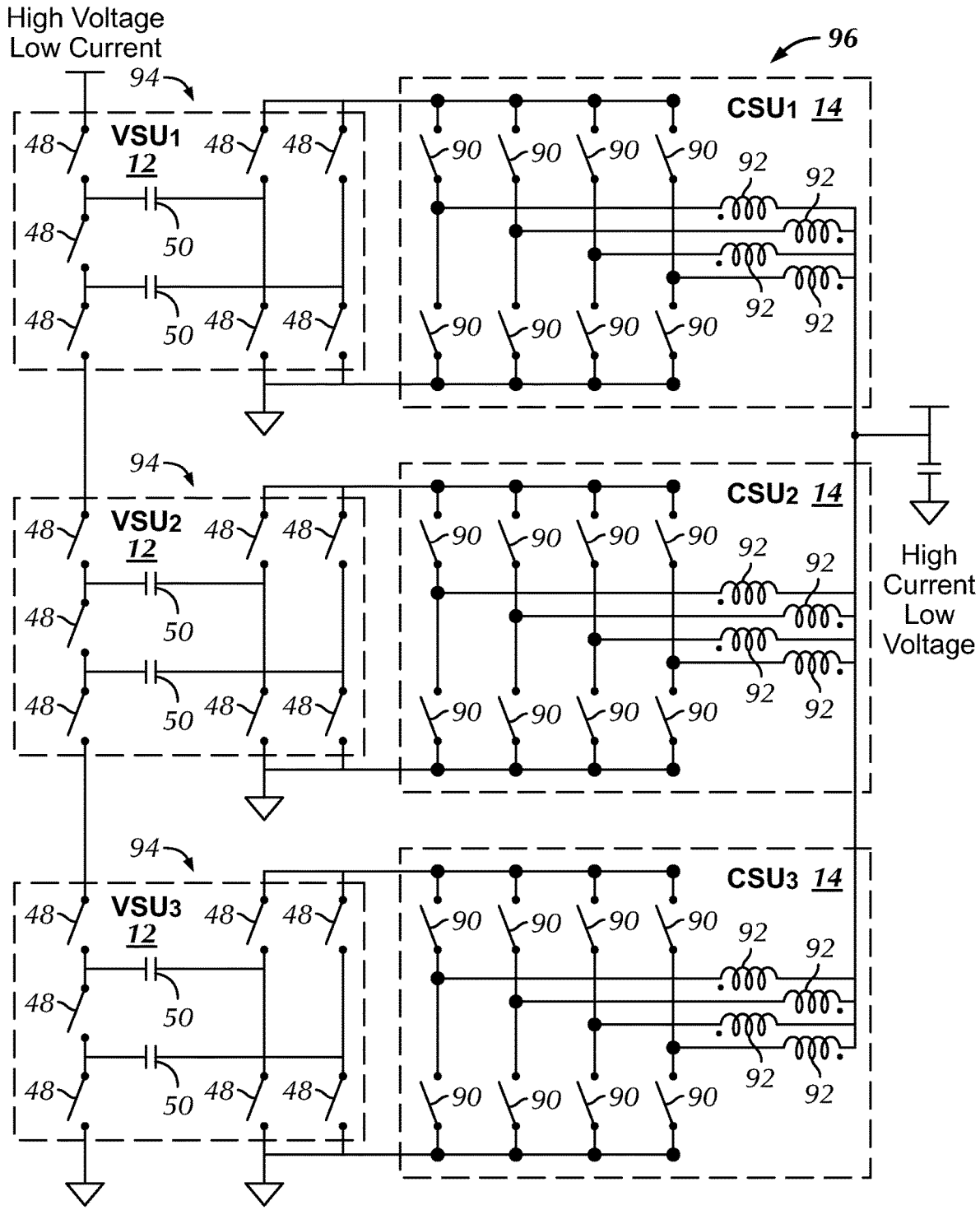
FIG. 6 depicts a schematic diagram of a modular high voltage conversion ratio power converter according to an embodiment of the present invention.

Multiple submodules 94 are connected to build a full modular system. The HV ports of the VSUs 12 are connected in series to split the voltage on the high voltage side, and the CSUs 14 are connected in parallel to split the current on the low voltage side. FIG. 6 depicts an example full modular system 96 including three submodules 94. This specific embodiment can offer a voltage conversion ratio of 24:1 or higher. It is to be noted the three submodules 94 are shown only for exemplary purposes, and any number of submodules 94 can be used depending on the embodiment. To achieve the optimal efficiency and power density, it is beneficial to operate the VSUs 12 at low frequency (e.g., below 500 kHz) and operate the CSUs 14 at high frequency (e.g., above 1 MHz). Operating the VSUs 12 at lower frequencies can improve the system efficiency without sacrificing the system power density and operating the CSUs 14 at high frequencies can extend the control bandwidth.

Figure 7A:
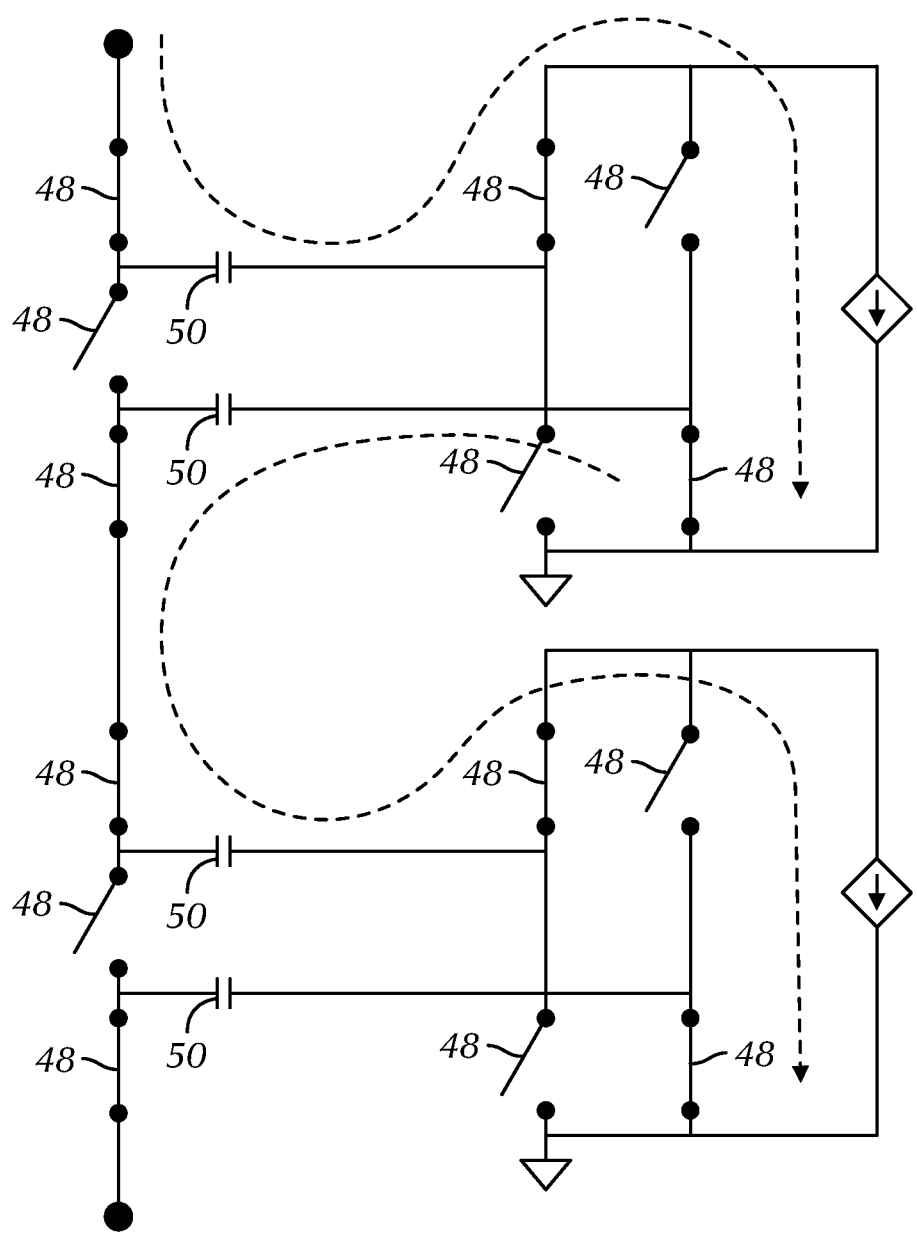
FIG. 7(a) depicts a schematic diagram of a first phase of a switched capacitor VSU according to an embodiment of the present invention.
Figure 7B:
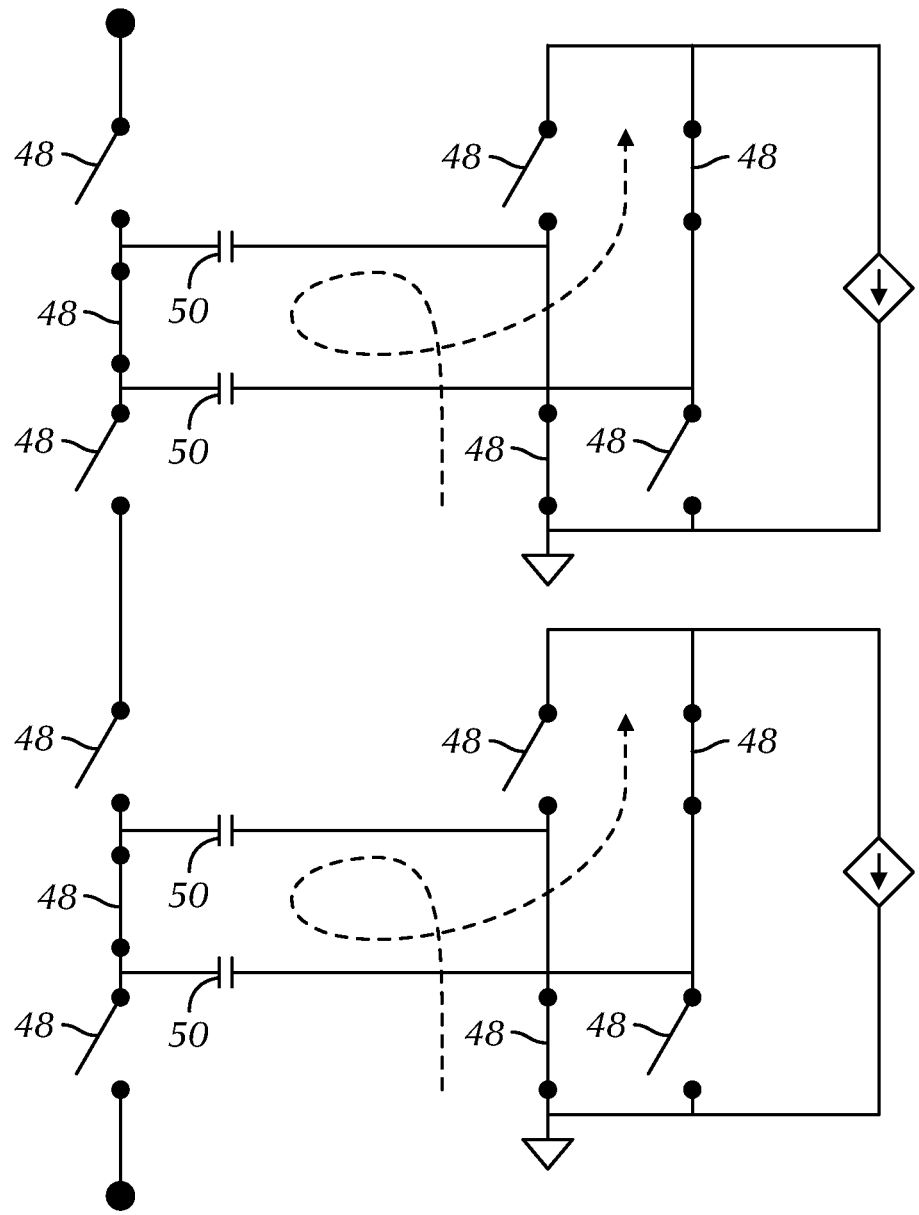
FIG. 7(b) depicts a schematic diagram of a second phase of the switched capacitor VSU according to an embodiment of the present invention.

As illustrated in FIGS. 7(a)-(b), the seven switches 48 in the switched capacitor unit 46 operate in two phases to enable soft charging operation. FIG. 7(a) depicts phase one and FIG. 7(b) depicts phase two. Typical switched capacitor circuits are hard-charged and hard-switched. At each switching instance, two or more capacitors are connected in parallel with charge sharing loss. By connecting a 2:1 switched capacitor unit 46 with a multiphase coupled-inductor buck converter 88, as illustrated in FIG. 6, one capacitor 50 is never connected in parallel with another capacitor 50, eliminating the charge sharing losses. With soft-charging operation, the size of the capacitors 50 can be significantly reduced even though the converter operates at low frequencies, improving the efficiency and power density.

In many applications, the input voltage of power conversion modules may change across a wide range (e.g., from 40V-60V for telecom brick converters). The digital electronics also often operate dynamically over a range of output voltages. It is also desirable in many applications to develop a single converter to handle a range of desired output voltages. In this architecture, the VSU 12 operates as a DC-transformer and has a fixed voltage conversion ratio. The voltage regulation is performed by the CSU 14 by changing the duty ratio.

Described below are two specific configurations of the stackable voltage regulation module. The first configuration (FIG. 8) combines 2:1 switched capacitor circuits with multiphase coupled inductor units. The capacitors in the switched-capacitor units are charged and discharged by a square wave current, minimizing the conduction loss. The second configuration (FIG. 10) combines high efficiency resonant switched capacitor units with tapped-inductor derived converters. The capacitors in the resonant switched-capacitor units are charged and discharged by a sinusoidal current due to the presence of a L-C resonant tank in each switched capacitor unit. Compared to a conventional buck converter, this converter can offer a high voltage conversion ratio with extended duty ratio. FIG. 9 depicts the 2:1 square wave VSU and the 2:1 sine wave VSU. The inclusion of the $L_R$ and $C_F$ changes the current flowing through the two capacitors.

Figure 8:
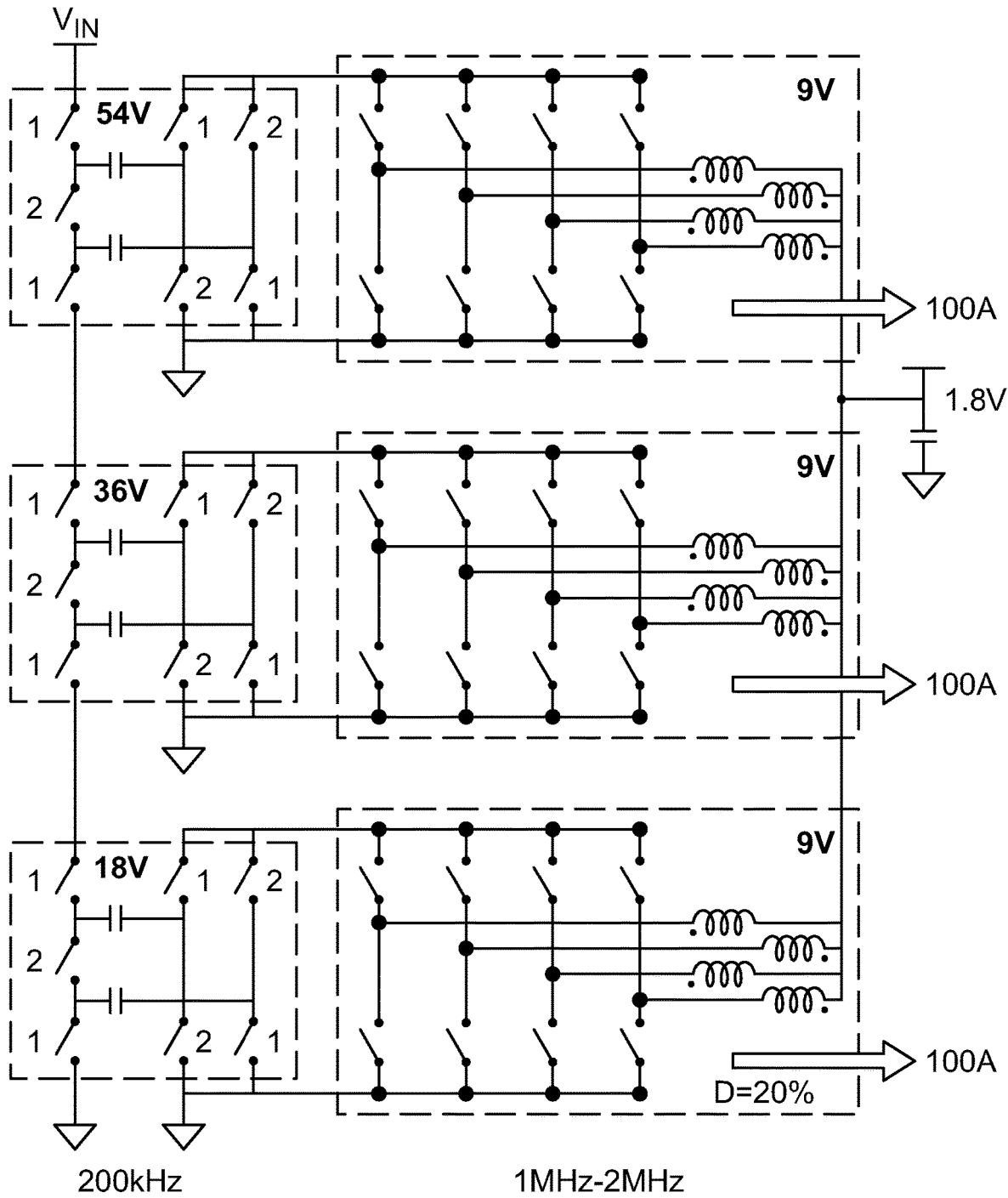
FIG. 8 depicts a schematic diagram of a power converter with three stackable submodules and square-wave soft-charging according to an embodiment of the present invention.

FIG. 8 depicts a three-submodule 54V-9V-1.8V 300 A configuration with a square-wave soft-charging switched-capacitor circuit. Each stackable submodule includes a 2:1 switched capacitor cell (with square wave current) and a 4-phase coupled inductor buck converter. The seven switches in the switched capacitor cell are grouped into two phases and are turned on and off periodically. The three series-connected 2:1 switched-capacitor cell offers a 6:1 voltage conversion ratio and steps the voltage down to 9V. As illustrated in FIG. 8, with four interleaved phases, each having a 25% duty ratio, the buck converter behaves as a constant current source, enabling full soft-charging of the series connected capacitors. The current in all capacitors and switches are square-waves with minimum root mean square. Zero-current-switching (ZCS) can be achieved during the off period of the 4-phase buck converter. The soft-charged front-stage can operate at low frequencies (e.g., 200 kHz) and achieve very high efficiencies. Each submodule only needs one magnetic component and can be very compact.

Figure 10:
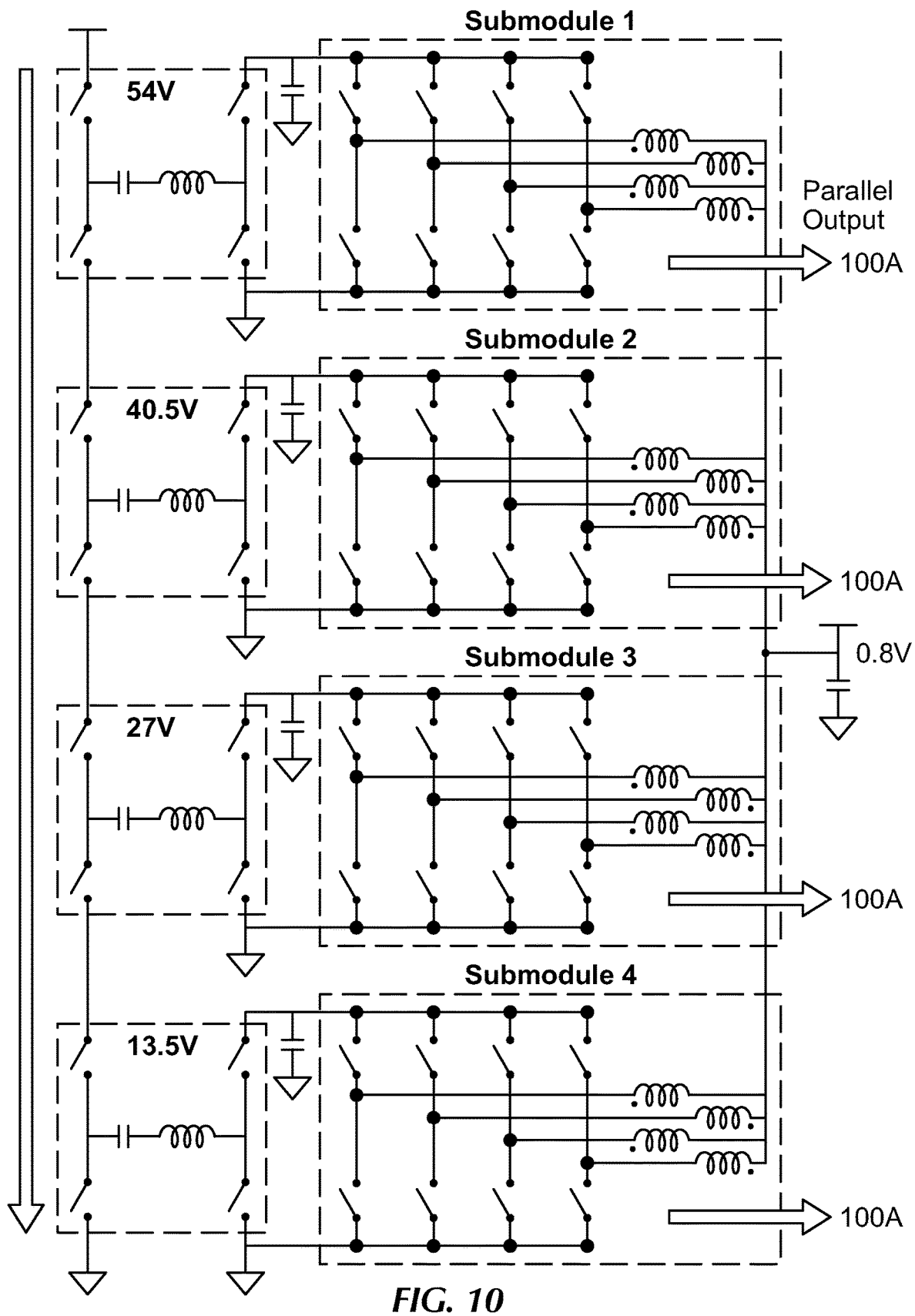
FIG. 10 depicts a schematic diagram of a power converter with four stackable submodules and sinusoidal-wave soft-charging according to an embodiment of the present invention.

FIG. 10 shows a stackable submodule configuration with sine-wave soft-charging. As illustrated, one VSU and one CSU are merged together as a submodule. The input ports of a few submodules are connected in series to block high input voltage. The output ports of a few submodules are connected in parallel to supply high current. The sine-wave VSU has two more components than the square-wave VSU: the resonant inductor $L_R$, and the decoupling capacitor $C_F$. $L_R$ and $C_F$ ensure sinusoidal capacitor current in the VSU stage. With the VSU operating at a few hundred kHz, $L_R$ can be implemented as nH-level PCB trace inductors, as a nonlimiting example. The square-wave VSU has lower component count and can achieve high efficiency and high power density.

Both implementations leverage the advantages of the soft-charging concept, removes the challenges of high efficiency, high power density, and high bandwidth, and can automatically maintain current balancing of multiple submodules. As illustrated in FIG. 8 and FIG. 10, the VSUs evenly divide the high voltage into multiple voltage domains, and the CSUs evenly divide the high current into multiple current paths. The voltage stress and current stress of all the switches in all the VSUs are identical. The voltage stress and current stress of all the switches in all the CSUs are also identical. As a result, the architecture is fully modular and extendible. The VSUs and CSUs can be reconfigured into a range of voltage ratings and current ratings and be applied to a variety of applications.

Figure 11:
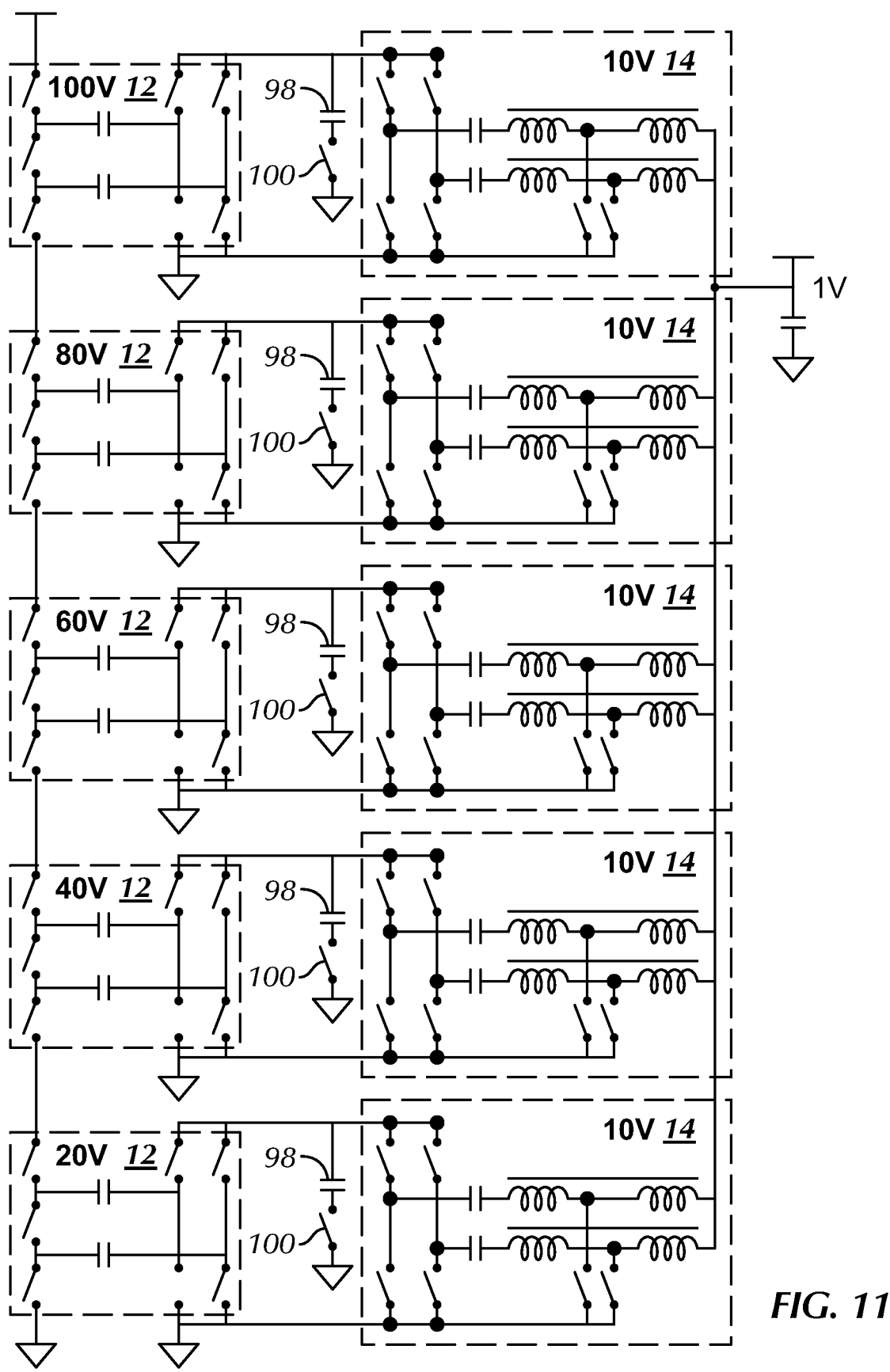
FIG. 11 depicts a schematic diagram of a 100:1 power converter with five series-input parallel output 20:1 submodules according to an embodiment of the present invention.

To achieve the maximum efficiency and power density, the VSU and the CSU should be directly connected as one submodule without a filter capacitor in between to hold the intermediate voltage bus. However, a small capacitance is needed during the startup process to ensure the capacitors of the VSUs are pre-charged to the desired voltage level needed by steady state operation. One solution is to add a capacitor 98 connected in series with a switch 100 on the intermediate bus between the VSU 12 and the CSU 14, as illustrated in FIG. 11. This capacitor 98 is connected to the intermediate bus during the startup and transient process and is disconnected from the intermediate bus during steady state operation. As a result, in steady state, the CSU 14 operate as a current source and soft-charge the capacitors in the VSU 12. In this specific implementation, the CSU 14 is implemented as a two-phase coupled inductor derived DC/DC converter with extended duty ratio, and the VSU 12 is implemented as a 2:1 switched capacitor circuit. This specific converter, with a 2:1 turns ratio on the coupled inductor and 50% duty ratio on the switches of the CSU 14, can offer 100:1 voltage conversion ratio with high performance. The five series stacked VSUs 12 each offers a voltage conversion ratio of 2:1, and the coupled-inductor derived CSUs 14 each offers a voltage conversion ratio of 10:1.

Figure 12:
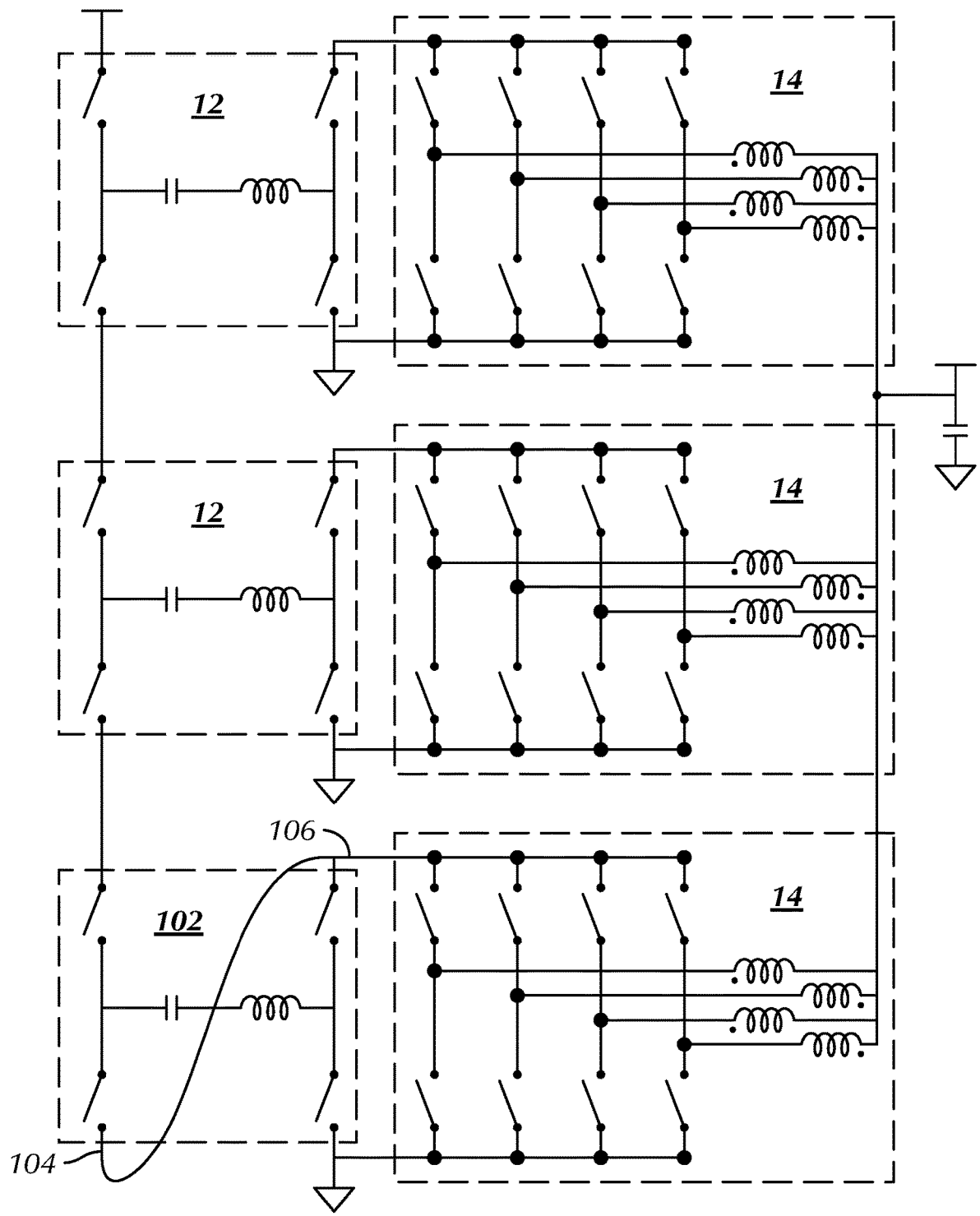
FIG. 12 depicts a schematic diagram of a power converter with three submodules and a modified bottom VSU with two terminals interconnected according to an embodiment of the present invention.

FIG. 12 depicts a three-submodule system with a modified VSU 102 at the bottom level. For this modified VSU 102, one terminal 104 of the HV port is connected directly to one terminal 106 of the LV port. In this configuration, the overall system can achieve a higher voltage conversion ratio than a normal configuration, but the bottom submodule processes two times more power than other submodules and has two times higher current stress. As a result, the devices used in the CSU 14 of the bottom submodule need to be two times larger than those in the other submodules. This configuration is applicable to configurations where additional voltage conversion ratio is needed.

Figure 13:
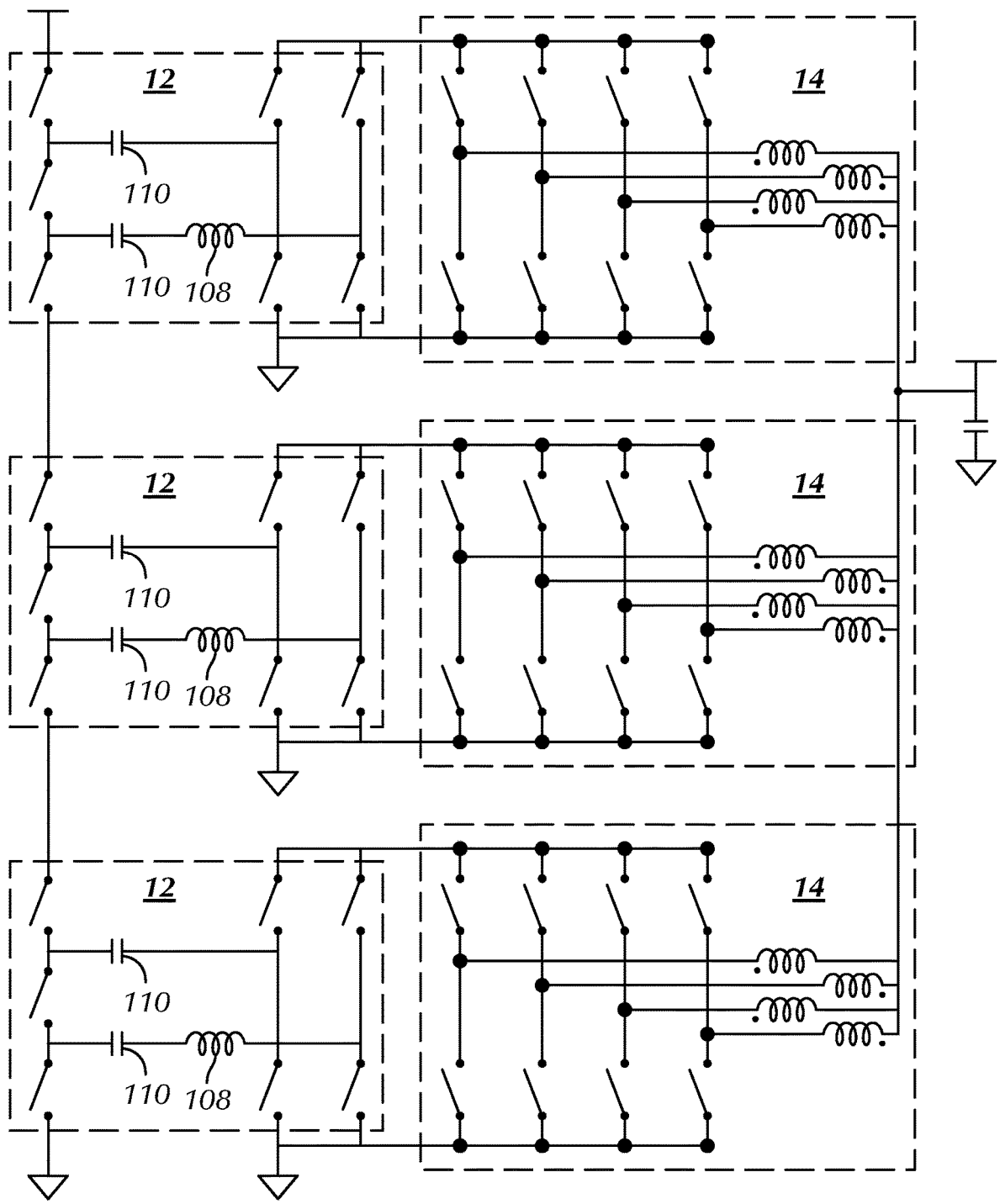
FIG. 13 depicts a schematic diagram of a power converter with three submodules and a 2:1 resonant switched tank VSU according to an embodiment of the present invention.

FIG. 13 depicts a three-submodule system with 2:1 resonant VSUs 12 in each submodule. Different from the VSUs 12 shown previously, the VSUs 12 in this configuration have an inductor 108 connected in series with one of the two blocking capacitors 110 in each 2:1 resonant VSU 12. The resonant frequency of this LC tank is carefully selected such that it is equal to the switching frequency of the system. The current flow through the LC resonant tank is a sinusoidal current, which enables zero-current switching of the full system.

Figure 14:
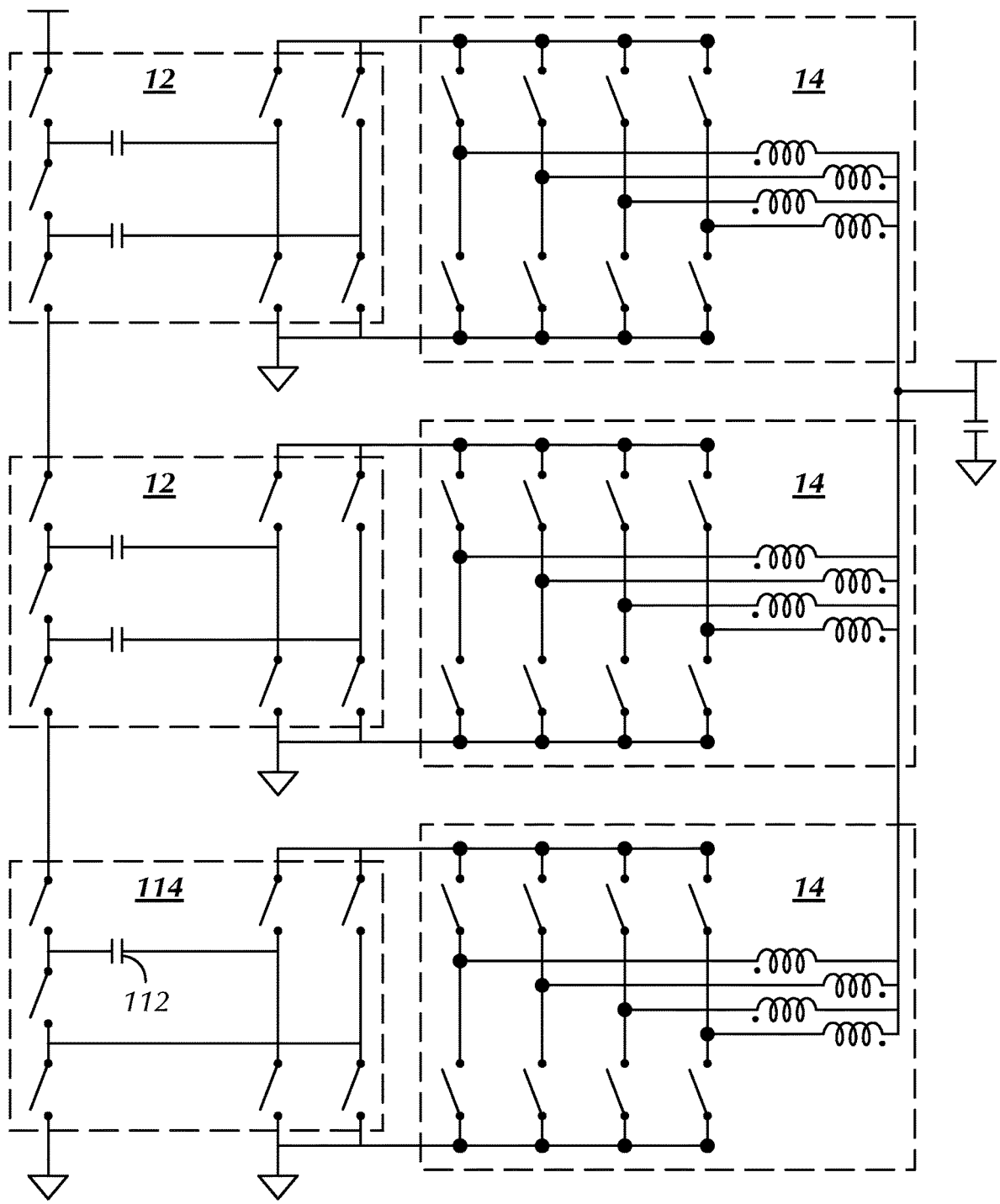
FIG. 14 depicts a schematic diagram of a power converter where one capacitor in the bottom 2:1 switched capacitor VSU is eliminated and shorted according to an embodiment of the present invention.
Figure 15:
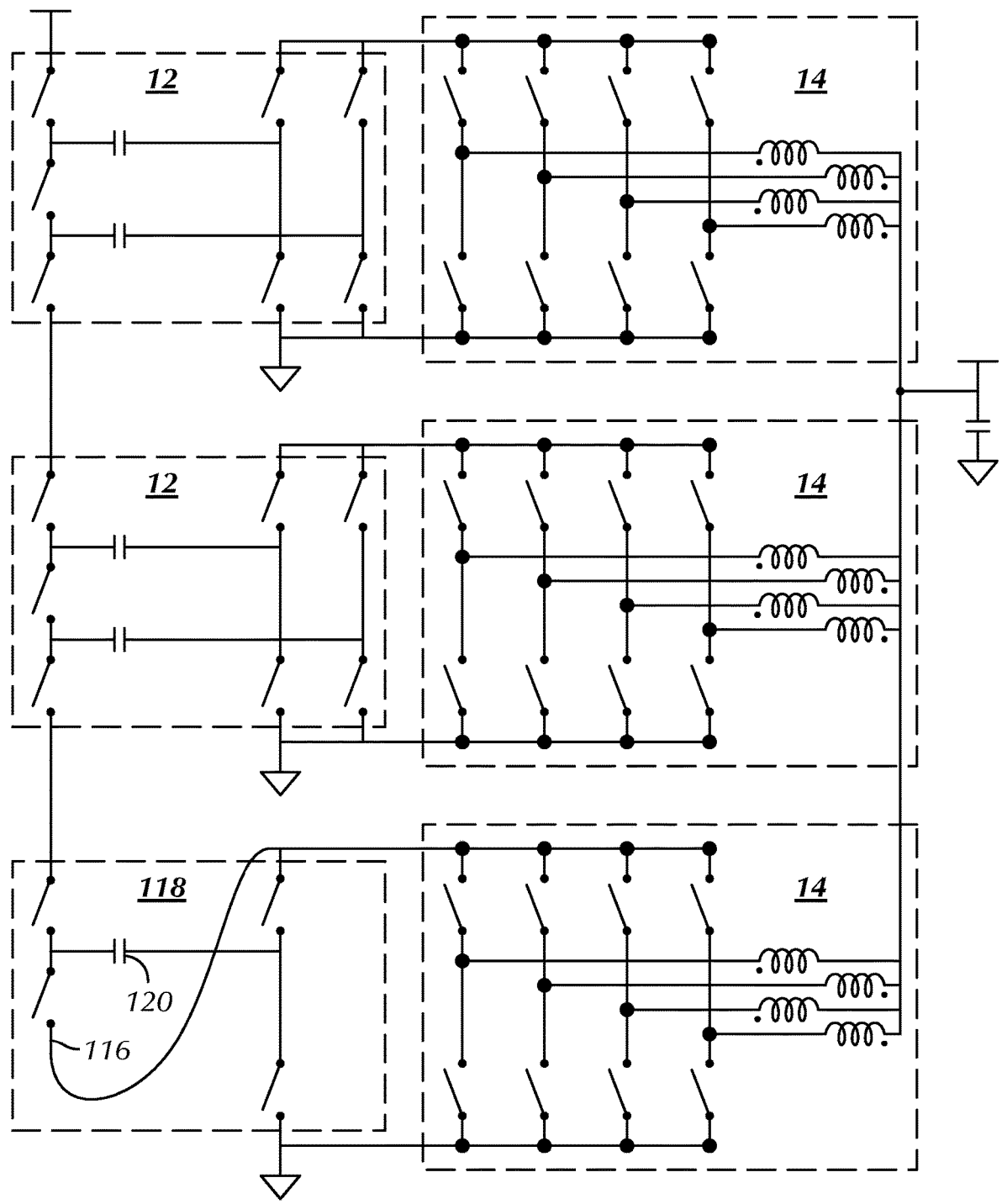
FIG. 15 depicts a schematic diagram of a power converter where one capacitor branch in the bottom 2:1 switched capacitor VSU is bypassed according to an embodiment of the present invention.

FIG. 14 depicts a modified version of the topology shown in FIG. 8 with one capacitor 112 of the bottom VSU 114 shorted. This modification can improve the overall system performance by eliminating the charge transfer loss caused by the bottom capacitor 112. FIG. 15 depicts another modified version of the topology shown in FIG. 8 with a bypass link 116 placed in the bottom VSU 118. Similarly, this link eliminates the charge transfer loss caused by the bottom capacitor 120 and extends the conversion ratio.

FIGS. 16(*a*)-(*d*) depict four modified VSUs that can be utilized as the bottom VSU 122 in a plurality of VSUs 12 to offer advantages. FIGS. 16(*a*)-(*c*) connect the bottom terminal of the VSU 122 to the positive side of the output terminal. The VSU 122 shown in FIG. 16(*d*) replaces the bottom capacitor as a short, which helps to reduce the loss due to the charge transfer.

It is to be noted all these VSUs, as well as the VSUs shown in FIGS. 8-15 can be mixed together as one system with modular building blocks. Similarly, all the CSUs shown in this disclosure are compatible with the VSUs, and can be merged with a variety of VSU implementations to realize targeted goals. Any combination of VSUs and CSUs can be implemented depending on the embodiment.

Further generally disclosed herein are embodiments of a 48 V-1.5 V merged-two-stage hybrid-switched-capacitor converter with a Linear Extendable Group Operated Point-of-Load (LEGO-PoL) architecture for high current microprocessors. The disclosed LEGO-PoL converter leverages the advantages of switched-capacitor (SC) circuits and multiphase buck circuits and can achieve soft charging, current sharing, and automatic voltage balancing. The SC circuits are connected in series to split the high input voltage into multiple stacked voltage domains, and the multiphase buck circuits are connected in parallel to split the high output current into multiple parallel current paths. The inductors of the multiphase buck converters are used as current sources to soft-charge and soft-switch the switched-capacitor circuits, and the switched-capacitor circuits are utilized to ensure current sharing among the multiphase buck circuits. The voltage balancing and current sharing mechanisms of the LEGO-PoL architecture are investigated in detail. A 450 W, 48 V-1.5 V, 300 A LEGO-PoL converter with a peak efficiency of 96%, a full load efficiency of 87.7%, and a power density of 577 W/in$^3$ was built and tested to verify the effectiveness of the LEGO-PoL architecture.

Figure 17:
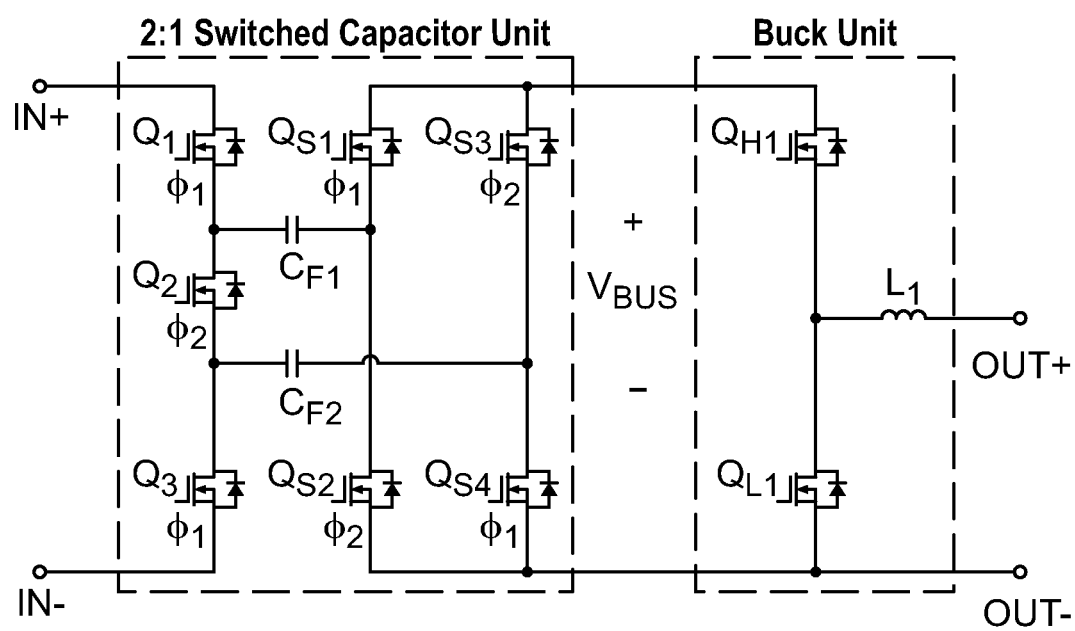
FIG. 17 depicts a schematic diagram of a submodule of a LEGO-PoL architecture according to an embodiment of the present invention.

FIG. 17 depicts a submodule of the LEGO-PoL architecture including a 2:1 switched-capacitor unit and a single-phase buck unit. There is no DC-decoupling capacitor between the two units. Many 2:1 switched-capacitor units can be stacked in series on the input side and they usually operate at a lower switching frequency, e.g., below 500 kHz. Many buck units can be connected in parallel on the output side and they usually operate at a higher frequency, e.g., above 1 MHz. The inductors of the buck units charge and discharge the capacitors of the switched-capacitor unit with soft-charging. The capacitors ($C_{F1}$ & $C_{F2}$) of the switched-capacitor unit are used as the input capacitors of the buck unit.

Figure 18:
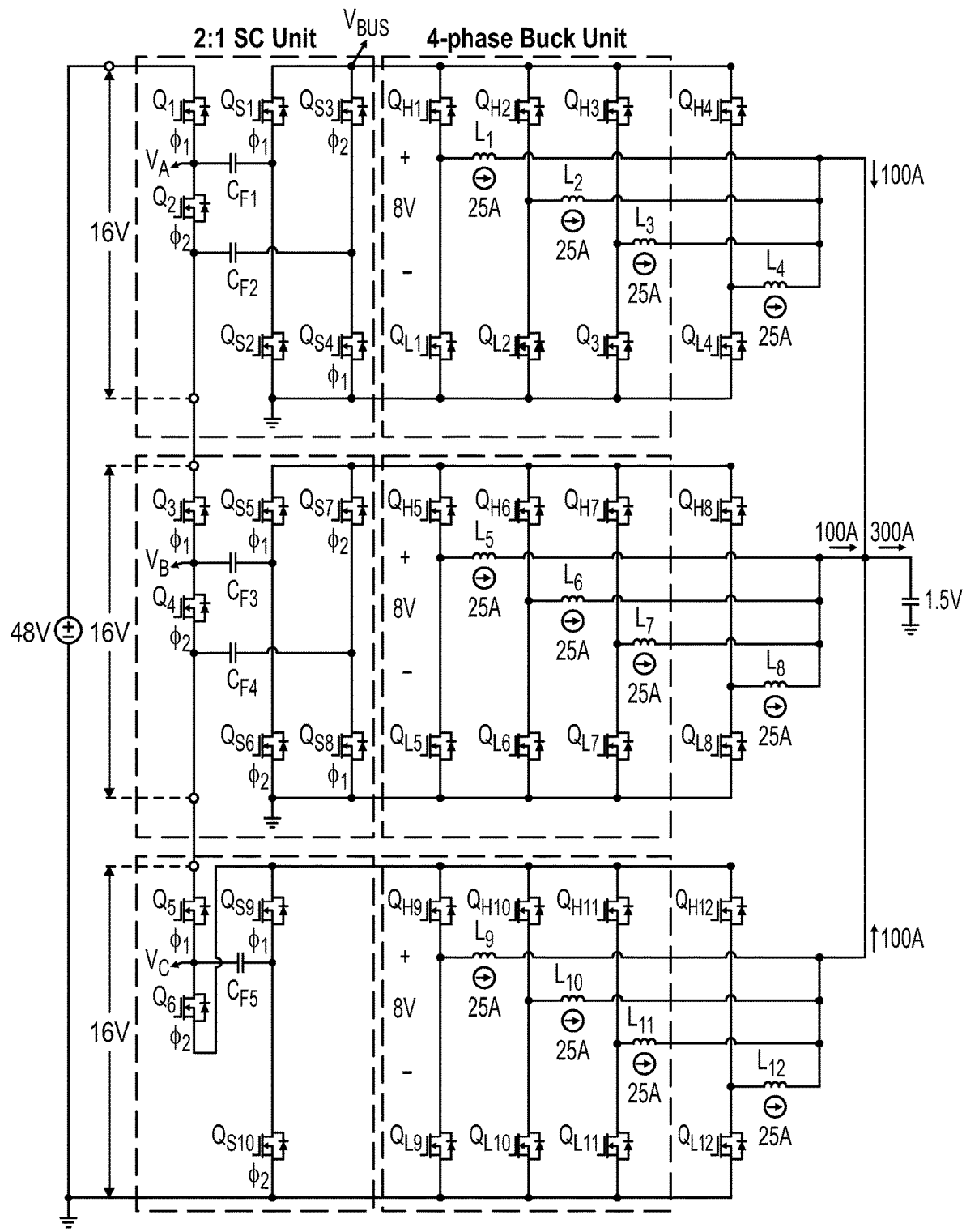
FIG. 18 depicts a schematic diagram of a LEGO-PoL architecture with three stacked submodules according to an embodiment of the present invention.

FIG. 18 depicts the topology of an example LEGO-PoL converter with three series-stacked 2:1 switched-capacitor units and three parallel connected 4-phase buck units. The three switched-capacitor units convert 48V to 8V (3×2:1=6: 1), and the three 4-phase buck units convert 8V to 1.5V and share 300 A. The 8V bus virtually exists and there is no decoupling capacitor between the switched-capacitor unit and 4-phase buck unit. Each of 4-phase buck units uses capacitors of its switched-capacitor stage as the input capacitor, and the inputs of the multiple 4-phase buck units are separated. The switched-capacitor units operate at a lower frequency (e.g., 100 kHz), and the multi-phase buck units operate at a higher frequency (e.g., 1 MHz). The dual-frequency operation enables high converter bandwidth for the microprocessors while offering high efficiency and high power density for the power conversion.

Figure 19:
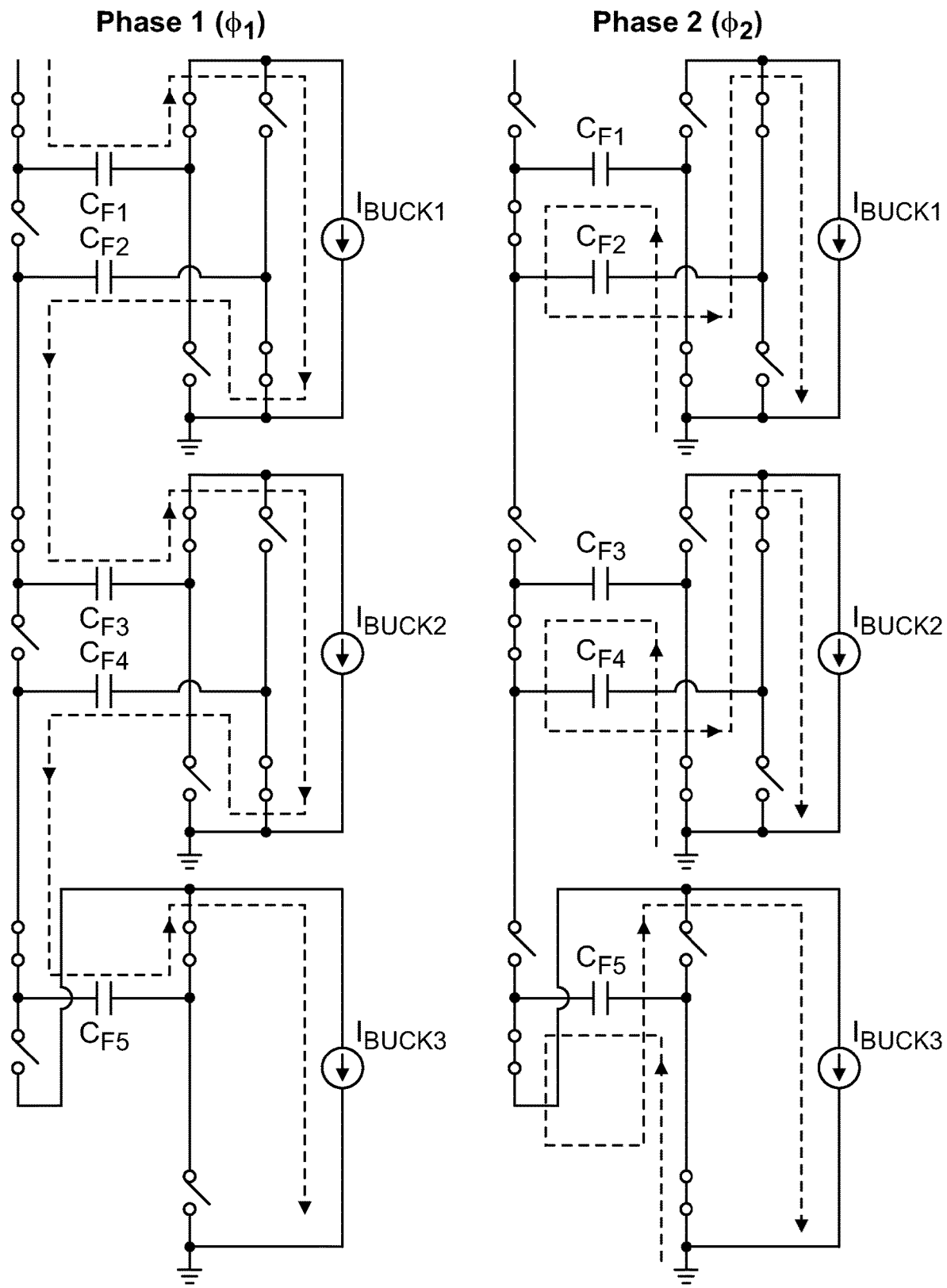
FIG. 19 depicts a diagram of current transfer mechanisms of a LEGO-PoL architecture according to an embodiment of the present invention.

As illustrated in FIG. 19, the operations of the two stages are highly integrated in the two operation states (the buck units are modeled as current sources). The multiphase buck units function as current sources to soft-charge the capacitors in the switched-capacitor units—the capacitors are never connected in parallel with each other. The capacitors in the switched-capacitor units are used as the decoupling capacitors for the buck units.

The LEGO-PoL architecture can be Linear Extended to cover a wide range of input voltage and output current, e.g., more than 100V input voltage, and more than 1000 A current. These building blocks are Group Operated with synchronized control signals. For example, in FIG. 18, three 16V, 100 A submodules are connected with their inputs in series to block the high input voltage (48V), and with their output in parallel to carry the high output current (300 A). The number of the switched-capacitor units can be linearly extended to cover a wider input voltage range; the number of the parallel units can be linearly extended (by adding more series and parallel units) to cover higher output current range.

Figure 20A:
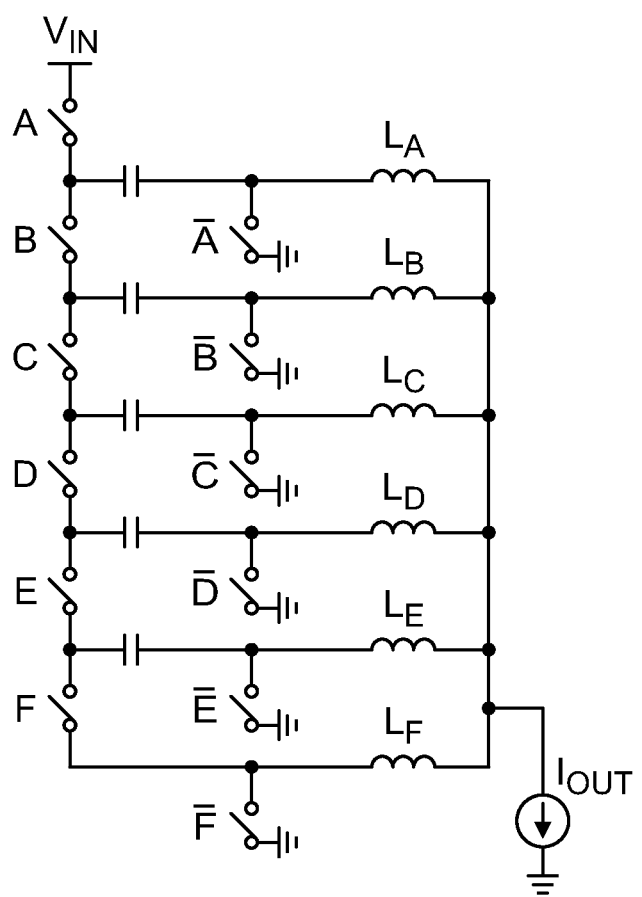
FIG. 20(a) depicts a schematic diagram of a single-stage series capacitor multiphase buck according to an embodiment of the present invention.
Figure 20B:
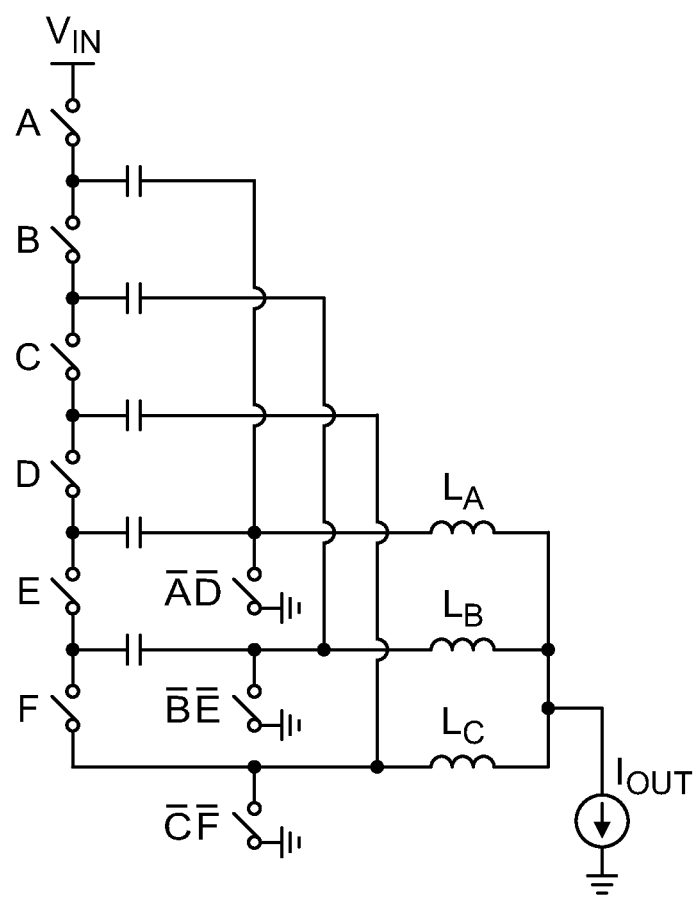
FIG. 20(b) depicts a schematic diagram of a single-stage switched-capacitor multiphase buck according to an embodiment of the present invention.
Figure 20C:
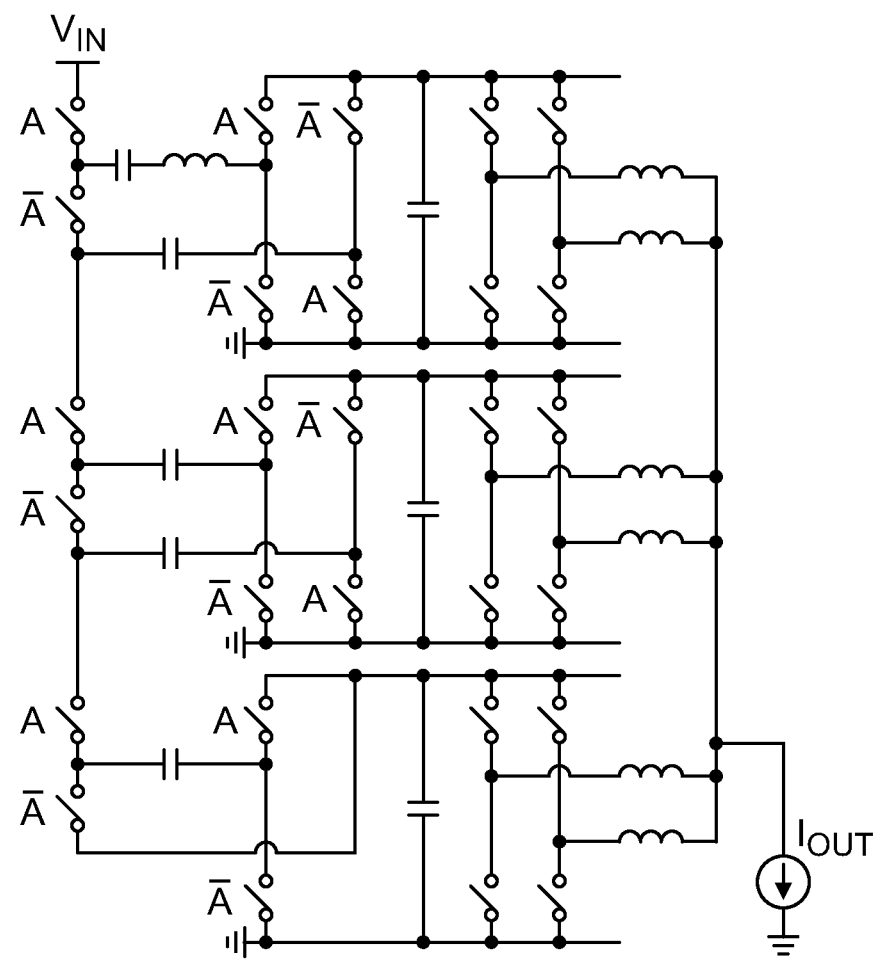
FIG. 20(c) depicts a schematic diagram of a two-stage switched-tank and multiphase buck according to an embodiment of the present invention.
Figure 20D:
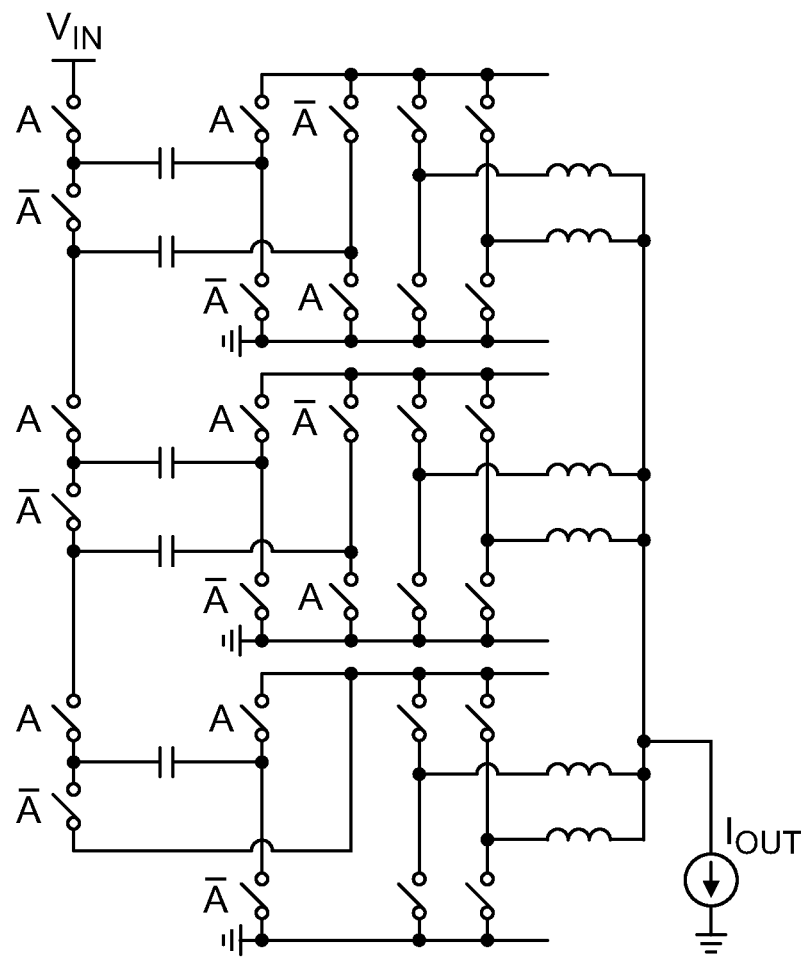
FIG. 20(d) depicts a schematic diagram of a merged two-stage switched-tank and multiphase buck according to an embodiment of the present invention.

FIGS. 20(a)-(d) compares a merged-two-stage architecture (FIG. 20(d)) against a few other single-stage and two-stage hybrid switched-capacitor configurations (FIGS. 20(a)-(c)). The table in FIG. 21 lists the key advantages and disadvantages of each topology. The merged-two-stage architectures removes the challenge of performing voltage conversion and high control bandwidth by operating at two different frequencies—the switched-capacitor units operate at a lower frequency (kHz range), and the multi-phase buck units operate at a higher frequency (MHz range). The decoupled operation of the merged-two-stage configuration offers unique zero-current-switching (ZCS) and soft-charging opportunities for the switched-capacitor units. The merged-two-stage architecture can also support a large number of interleaved current phases (e.g., 32 phases). It can leverage the state-of-the-art control techniques that have been developed for standard voltage regulation modules (VRMs). The architecture also decouples the high voltage stress on the input side and the high current stress on the output side by leveraging the series-input parallel-output configuration.

Figure 22:
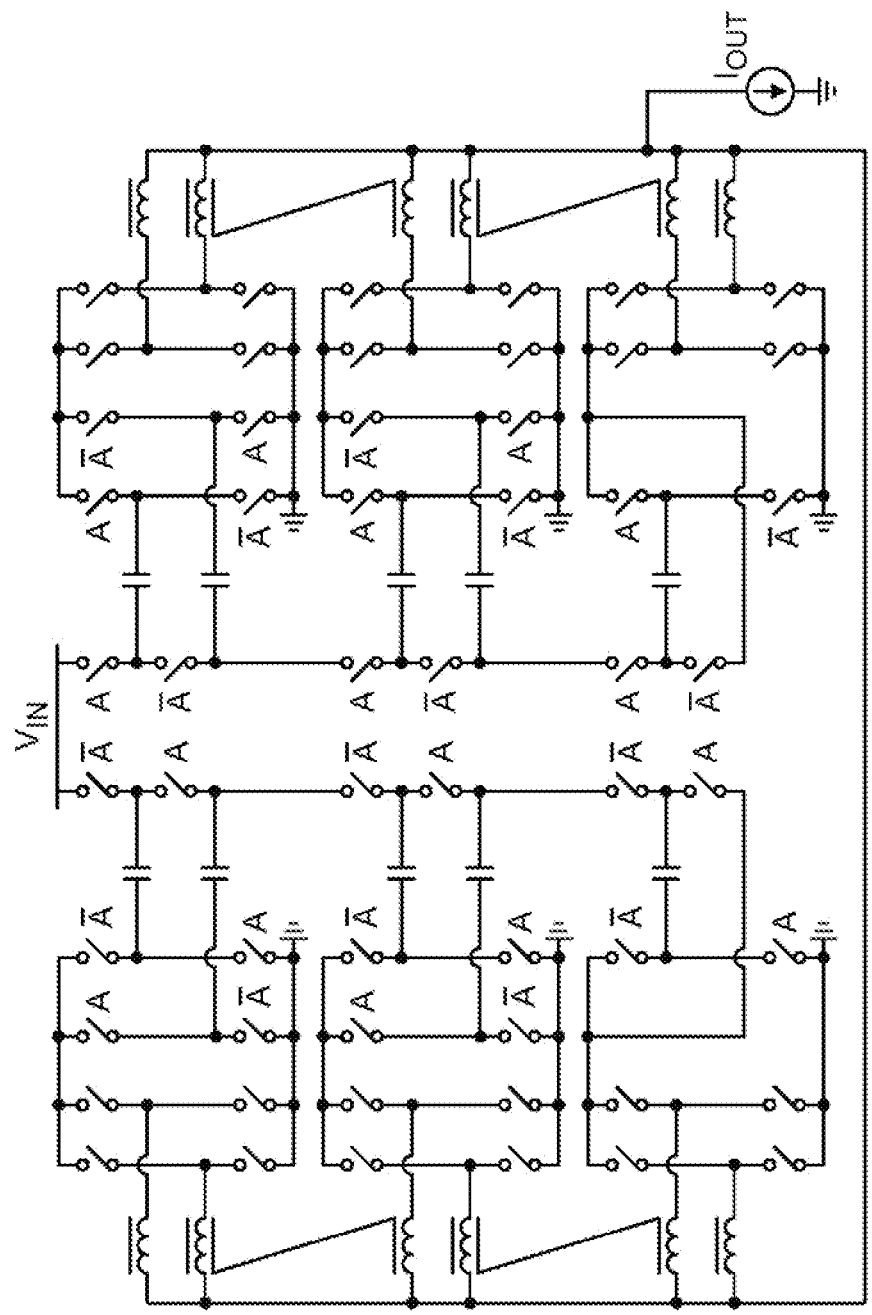
FIG. 22 depicts a schematic diagram of a LEGO-PoL converter with two interleaved input stacks and a plurality of coupled output inductors according to an embodiment of the present invention.

A two-stage architecture usually requires bulky buffering capacitors and many resonant inductors if resonant switched capacitor topologies are adopted. Single-stage architectures are usually smaller and more efficient, but they face challenges in control. The topology in FIGS. 20(a) and 20(b) need to operate in "split-phase" and/or with capacitance matching to achieve soft charging. The merged-two-stage architecture can offer comparable efficiency and power density as single-stage architectures, and can achieve comparable control performance as a two-stage solution. They have the capability of supporting coupled inductors and "merged-phase" operation during fast transience. Advanced voltage-mode or current-mode strategies can be directly applied. FIG. 22 shows an extended embodiment of the LEGO-PoL architecture with 1) interleaved input switches; and 2) cross-coupled multi-phase inductors. This architecture can completely eliminate the input current ripple (50% duty ratio), and can achieve very fast transient response (as a multiphase buck with coupled inductors).

The LEGO-PoL architecture decouples the voltage stress, current stress, and the dynamic requirements in a high current PoL converter and optimally addresses these challenges. Soft charging, current sharing, and voltage balancing mechanisms for the LEGO-PoL architecture will be described below.

As illustrated in FIG. 19, by combining a 2:1 switched-capacitor unit and a multi-phase buck unit and eliminating the decoupling capacitor between two units, the capacitors of the switched-capacitor units are always charged and discharged by the buck inductors, enabling full soft charging operation. Since the capacitors in the switched-capacitor stage are reused as the input capacitors for the multiphase buck stage, the soft-charging current loop should be extremely compact.

The automatic current sharing and voltage balancing mechanism of the LEGO-PoL architecture can be explained by analyzing the current flow in the two switching phases in FIG. 19. In each switching cycle, capacitor $C_{F1}$, $C_{F3}$, and $C_{F5}$ are charged by one current source in $\phi_1$, and discharged by another current source in $\phi_2$, similar for $C_{F2}$ and $C_{F4}$. Since the switched-capacitor converter operates with 50% duty ratio, the two current sources have to be equal, leading to current sharing between two adjacent modules, and sequentially current sharing to all modules. For example, $C_{F2}$ is discharged by $I_{BUCK2}$ in $\phi_1$, and charged by $I_{BUCK1}$ in $\phi_2$. $C_{F3}$ is charged by $I_{BUCK2}$ in $\phi_1$, and discharged by $I_{BUCK2}$ in $\phi_2$. To maintain the charge balance in $C_{F2}$ and $C_{F3}$, $I_{BUCK1}$ has to be equal to $I_{BUCK2}$ in steady state operation.

Figure 23:
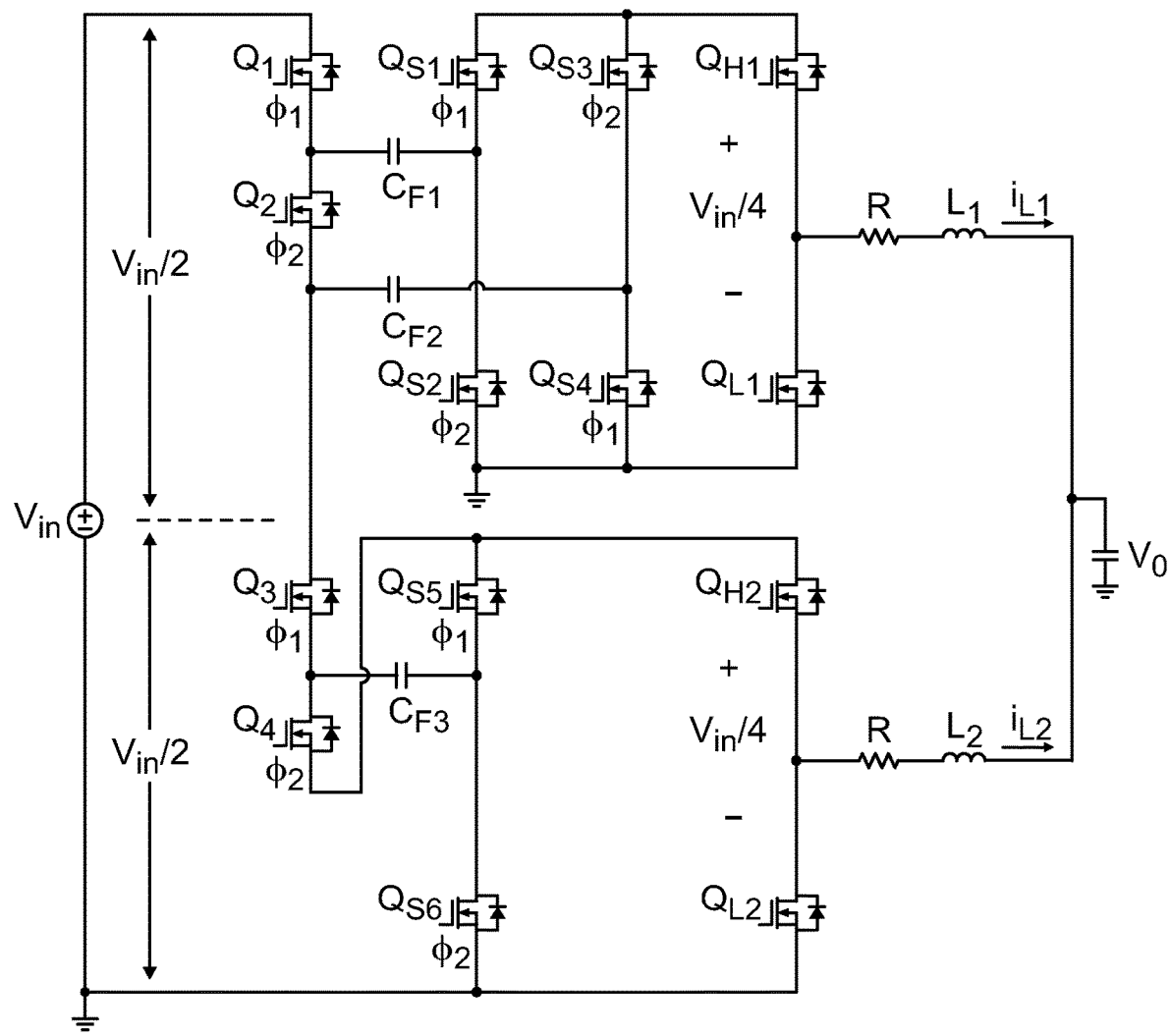
FIG. 23 depicts a schematic diagram of a 2-stack LEGO-PoL converter with 36V input voltage and 1.5V output voltage according to an embodiment of the present invention.

In order to illustrate the current sharing mechanism quantitatively, a large signal average analysis is performed on a n=2 design in FIG. 23. Assume each buck converter connected to the switched-capacitor stage is a single phase buck with inductance L, and L is connected with a series resistance R (representing the resistance of the buck converter including conduction loss and switching loss). Assume the duty ratio of the buck converter, i.e., the duty ratio of high side switches, is D, the large-signal average current of inductor $L_x$ is $i_x$, the large-signal average voltage of capacitor $C_{Fx}$ is $v_x$.

The large-signal average model equations include:

$$L_1 \frac{di_{L1}}{dt} = \langle v_{L1} \rangle = \frac{1}{2}(V_{in} - v_2)D - v_0 - i_{L1}R \quad (1)$$

$$L_2 \frac{di_{L2}}{dt} = \langle v_{L2} \rangle = \frac{1}{2}v_2 D - v_0 - i_{L2}R \quad (2)$$

$$C_{F2} \frac{dv_2}{dt} = \langle i_{CF2} \rangle = \frac{1}{2}(Di_{L1} - Di_{L2}) \quad (3)$$

$$\frac{d^2(i_{L1} - i_{L2})}{dt^2} + \frac{R}{L} \frac{d(i_{L1} - i_{L2})}{dt} + \frac{D^2}{2LC_{F2}}(i_{L1} - i_{L2}) = 0 \quad (4)$$

Unlike a traditional buck converter, the charge balance requirement of capacitor $C_{F2}$ leads to the automatic current sharing mechanism between $L_1$ and $L_2$. Assuming that $L_1=L_2=L$, a second-order differential equation with explicit solutions (4) describes the large-signal dynamics of the current difference as a function of the circuit parameters and initial conditions. The natural frequency $\omega_n$ of this second order oscillation system is $$\frac{D}{\sqrt{2LC_{F2}}}.$$

The damping ration $\zeta$ is $$\frac{R}{2D}\sqrt{\frac{2C_{F2}}{L}}.$$

The decay rate $\alpha$ is $$\frac{R}{2L},$$

the quality factor Q is $$\frac{D}{R}\sqrt{\frac{L}{2C_{F2}}}.$$

The current difference will respond to perturbations like a second-order system, and gradually decay to zero in periodic steady state. The current sharing mechanism of the LEGO-PoL converter is very similar to that of series-capacitor buck converter. Note $C_{F1}$ and $C_{F3}$ have no impact on the current sharing dynamics.

Figure 24:
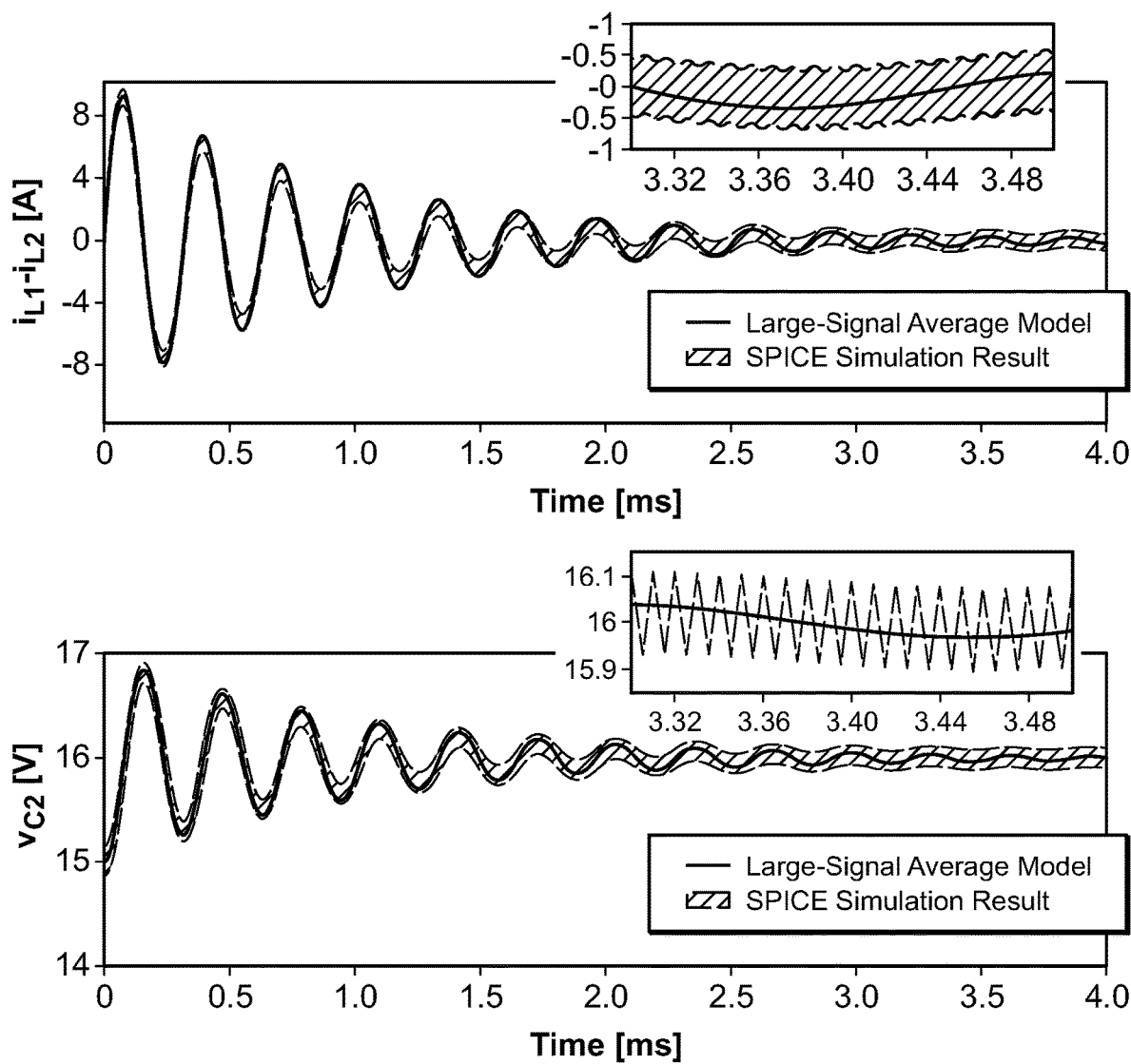
FIG. 24 depicts a graph of a large-signal average model and SPICE simulated transient waveforms of the automatic current sharing dynamics according to an embodiment of the present invention.

As illustrated in FIG. 24, the large-signal average modeling results match well with the SPICE simulation results. In periodic steady state, the large signal current $i_{L1}=i_{L2}$, and $$\frac{di_{L1}}{dt} = \frac{di_{L2}}{dt} = 0,$$

and as a result, the average voltage of $C_{F2}$, $v_2$, equals $\frac{1}{2}V_{in}$. This mechanism holds the large-signal average of $v_2$ at $\frac{1}{2}V_{in}$. Since $$C_{F2}\frac{dv_2}{dt} = \frac{D}{2}(i_{L1} - i_{L2}),$$

the transient dynamics of the capacitor voltage follows similar second-order transient dynamics (similar damping ratio and quality factor) as $i_{L1}-i_{L2}$ and gradually damps to $\frac{1}{2}V_{in}$ following the same oscillation. $v_2$ will be automatically maintained at 16V in this example embodiment.

A small buffer capacitor (in the nF scale) is placed between the switched-capacitor units and buck units to filter the high frequency current and maintain the voltage of $C_{F1}$ and $C_{F3}$ at 9V and 27V while not disturbing soft-charging.

Similar analysis can be extended to higher order designs. Assuming $L_1=L_2=L_3=L$ and $C_{F1}=C_{F3}=C$, the large-signal average model for a three submodule LEGO-PoL system is:

$$\ddot{X} + \frac{R}{L}\dot{X} + \frac{D^2}{4LC}MX = 0 \tag{5}$$

$$\ddot{X} = \begin{bmatrix} \frac{d^2 i_{L1}}{dt^2} \\ \frac{d^2 i_{L2}}{dt^2} \\ \frac{d^2 i_{L3}}{dt^2} \end{bmatrix} \tag{6}$$

$$\dot{X} = \begin{bmatrix} \frac{di_{L1}}{dt} \\ \frac{di_{L2}}{dt} \\ \frac{di_{L3}}{dt} \end{bmatrix} \tag{7}$$

$$X = \begin{bmatrix} i_{L1} \\ i_{L2} \\ i_{L3} \end{bmatrix} \tag{8}$$

$$M = \begin{bmatrix} 1 & -1 & 0 \\ -1 & 2 & -1 \\ 0 & -1 & 1 \end{bmatrix} \tag{9}$$

$$Q = \begin{bmatrix} -0.577 & -0.707 & 0.408 \\ -0.577 & 0 & -0.816 \\ -0.577 & 0.707 & 0.408 \end{bmatrix} \tag{10}$$

$$\Lambda = \begin{bmatrix} 0 & 0 & 0 \\ 0 & 1 & 0 \\ 0 & 0 & 3 \end{bmatrix} \tag{11}$$

Note M is a real symmetric matrix. M can be diagonalized as $M=Q\Lambda Q^{-1}$ where Q is a matrix composed of eigenvectors ($e_1$, $e_2$, $e_3$), and $\Lambda$ is a diagonal matrix composed of eigenvalues ($\lambda_1$, $\lambda_2$, $\lambda_3$) of M respectively. By denoting $Y=Q^{-1}X$, the above equations (5)-(8) can be rewritten as the following:

$$\ddot{Y} + \frac{R}{L}\dot{Y} + \frac{D^2}{4LC}\Lambda Y = 0 \tag{12}$$

$$\frac{d^2 y_1}{dt^2} = \frac{R}{L}\frac{dy_1}{dt} + \frac{D^2}{4LC}(\lambda_1 y_1) = 0 \tag{13}$$

$$\frac{d^2 y_2}{dt^2} = \frac{R}{L}\frac{dy_2}{dt} + \frac{D^2}{4LC}(\lambda_2 y_2) = 0 \tag{14}$$

$$\frac{d^2 y_3}{dt^2} = \frac{R}{L}\frac{dy_3}{dt} + \frac{D^2}{4LC}(\lambda_3 y_3) = 0 \tag{15}$$

Since $i_{L1}-i_{L3}$ is the same with $y_2$, the second order differential equation of ($i_{L1}-i_{L3}$) is:

$$\frac{d^2(i_{L1} - i_{L3})}{dt^2} = \frac{R}{L}\frac{d(i_{L1} - i_{L3})}{dt} + \frac{D^2}{4LC}(i_{L1} - i_{L3}) = 0 \tag{16}$$

Figure 25:
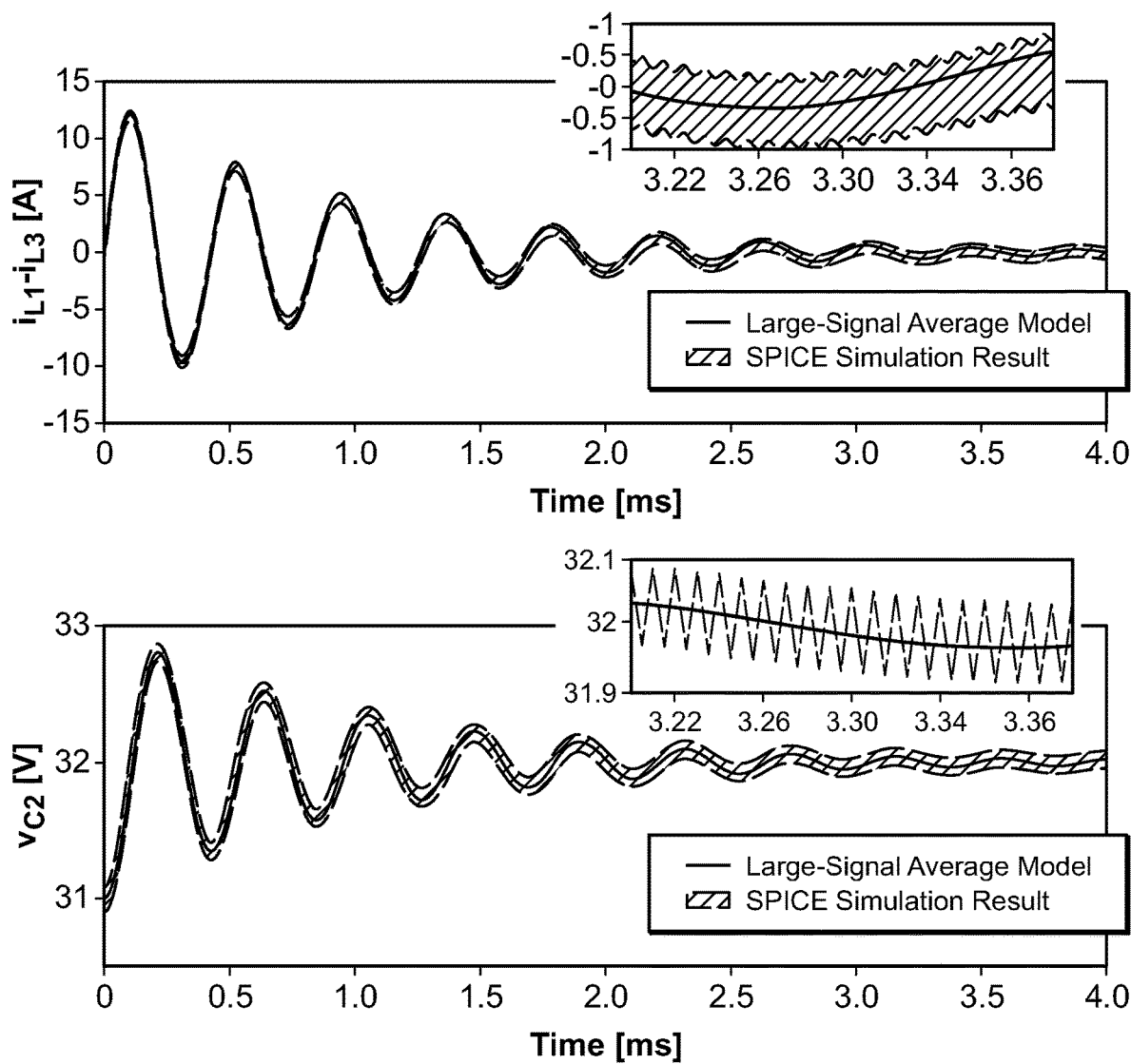
FIG. 25 depicts a graph of a large-signal average model and SPICE simulated transient waveforms of the automatic current sharing dynamics for an n=3 configuration according to an embodiment of the present invention.

This second order differential equation describes the large-signal dynamics of the current difference in the three-submodule topology. The current difference gradually damps to zero in periodic steady state. For this reason, the average voltages of $C_{F2}$ and $C_{F4}$, $v_2$ and $v_4$, reach $$\frac{2V_{in}}{3} \text{ and } \frac{V_{in}}{3},$$

respectively. As illustrated in FIG. 25, this large-signal average model also matches well with SPICE simulation results. The capacitance $C_{F1}$, $C_{F3}$, and $C_{F5}$ have no impact on the current sharing and voltage balancing.

While the equations above describe a three-submodule topology, it is to be noted this is a nonlimiting example and a generalized large signal average model of the LEGO-PoL architecture with an arbitrary N submodules can be derived by those skilled in the art. Automatic current sharing and automatic voltage balancing are guaranteed in a LEGO-PoL architecture with N submodules.

The series stacked 2:1 switched-capacitor units split the input voltage into small voltage domains. As a result, the LEGO-PoL converter can use low voltage rating devices with low on-resistance. The voltage ratings of the active switches are either $V_{BUS}$ or $2V_{Bus}$. Unlike traditional two-stage hybrid-switched-capacitor topologies, the voltages across all switches are clamped by the capacitors under all worst-case situations. The merged two-stage operation enables switches to operate at lower switching frequency with zero-current-switching (ZCS). For this reason, the switches in the switched-capacitor stage have reduced switching loss compared to other switched-capacitor implementations.

In many hybrid-switched-capacitor designs, the capacitors need to be carefully selected because the capacitance value determines the soft charging, soft-switching and resonant operation. The LEGO-PoL converter eliminates the resonant inductors in traditional resonant-switched-capacitor topologies and achieves soft charging operation by using the buck inductors as current sources. Smaller capacitance values with larger voltage ripple are allowed. The capacitance value does not need to be precisely controlled. This allows a variety of capacitors to be used in a LEGO-PoL design. Class-II (e.g., X5R, X5S, X6S, X7R, etc.) MLCC capacitors can be freely considered with high tolerance to DC voltage bias, temperature variation, and capacitance degradation.

The buck stage of the LEGO-PoL converter can follow the considerations of the standard VRMs using multiphase buck converters. The multiphase buck converters can be interleaved with their inductors coupled with each other. Advanced control techniques are directly applicable. Current sharing is guaranteed across the multiphase buck units belonging to different submodules. For example, in FIG. 18, the LEGO-PoL controller only needs to balance the current of each four-phase buck unit in a 12-phase interleaved operation. In a traditional 12-phase buck converter, the controller needs to balance the current of all 12 phases.

Eliminating the decoupling capacitor between two stages creates the soft-charging and soft switching opportunities, but brings challenges in printed circuit board layout and configuration. The capacitors of the switched-capacitor units are reused as the input capacitors of the buck units. As a result, the high frequency current loop between the switched-capacitor units and the buck units should be as small as possible.

Figure 26:
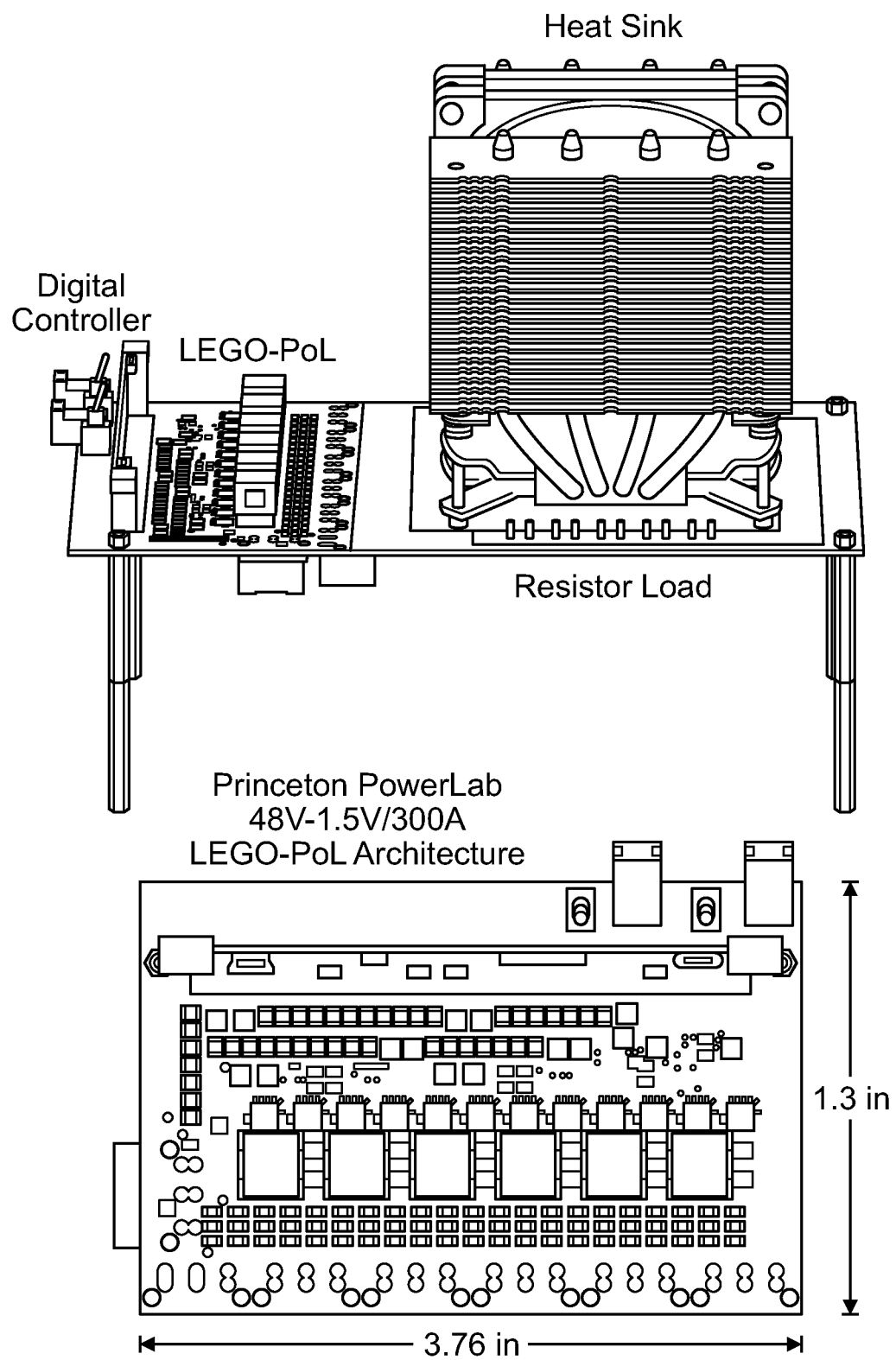
FIG. 26 depicts a LEGO-PoL prototype with three series-stacked submodules and twelve interleaved buck phases according to an embodiment of the present invention.
Figure 28:
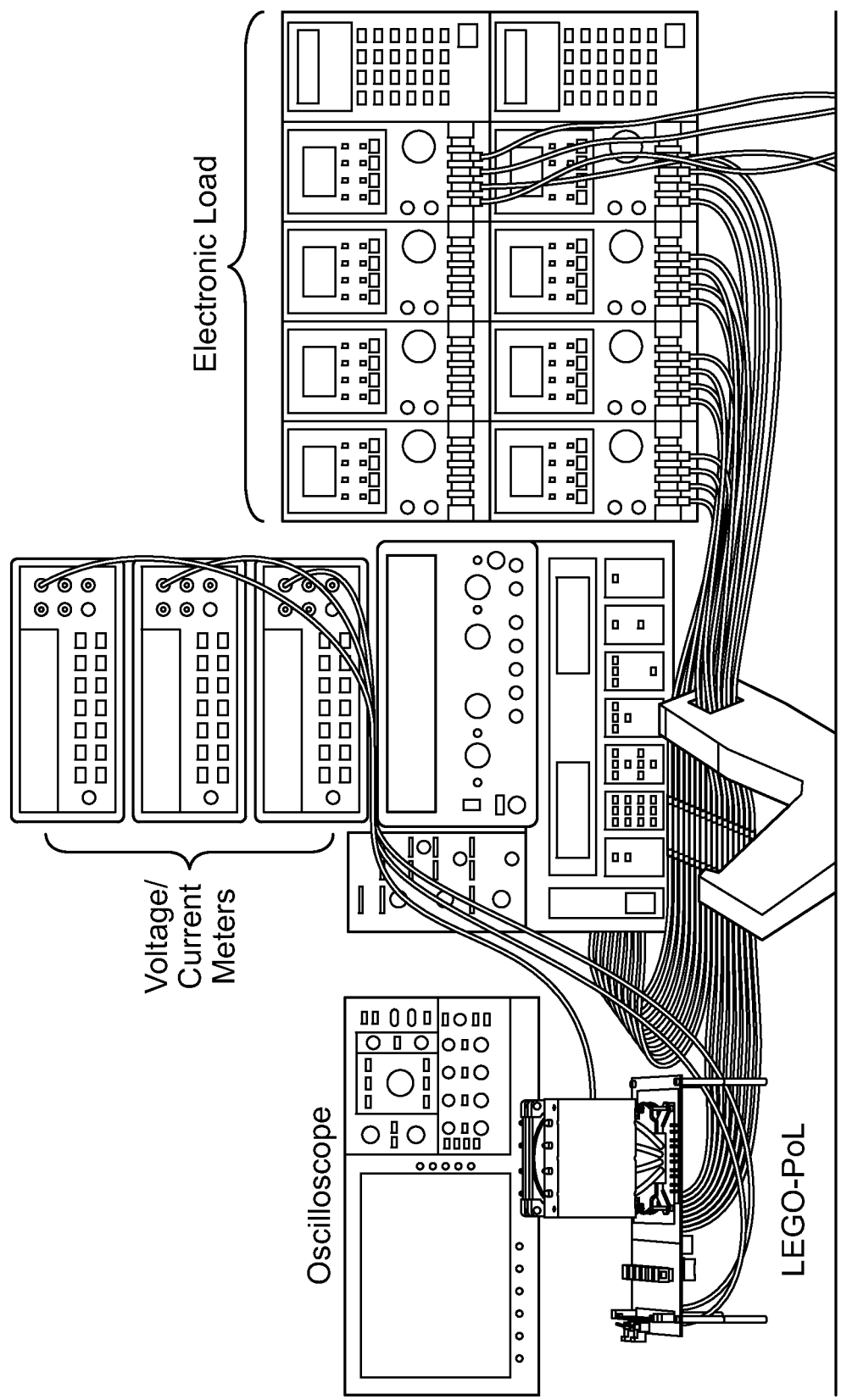
FIG. 28 depicts an experimental platform for the LEGO-PoL prototype according to an embodiment of the present invention.

To verify the effectiveness of the LEGO-PoL architecture, a 40V-60V input (48 V nominal) and 1.5V, 300 A output was built and tested. FIG. 26 show the prototype, with a schematic diagram of the circuit topology shown in FIG. 18. Three 2:1 switched-capacitor stages were stacked in series on the input side (48V), and three 4-phase buck units were connected in parallel on the output side (1.5V, 300 A). The table in FIG. 27 lists the bill-of-material (BOM) of this configuration. The switches in the switched-capacitor units are implemented as standard MOSFETs. The switches in the multi-phase buck units are implemented as low voltage DrMOS. $C_{F1}$-$C_{F5}$ are 45 µF. It is to be noted in a traditional two-stage configuration with similar performance, the capacitor size would be 150 µF. 500 nF 0603 size capacitors are used as input capacitors of the DrMOS. The buck inductor is 1 µH. The power density of the prototype (considering the power stage) is 577 W/in$^3$. FIG. 28 shows the experimental platform. Two Chroma 63103 A are connected in parallel as the electronic load. Agilent 34401 and 34330 A current shunts were used for measuring efficiency. A Tektronix current probe (TCP404XL & TCPA400) was used to measure the transient of the current waveform.

Figure 29A:
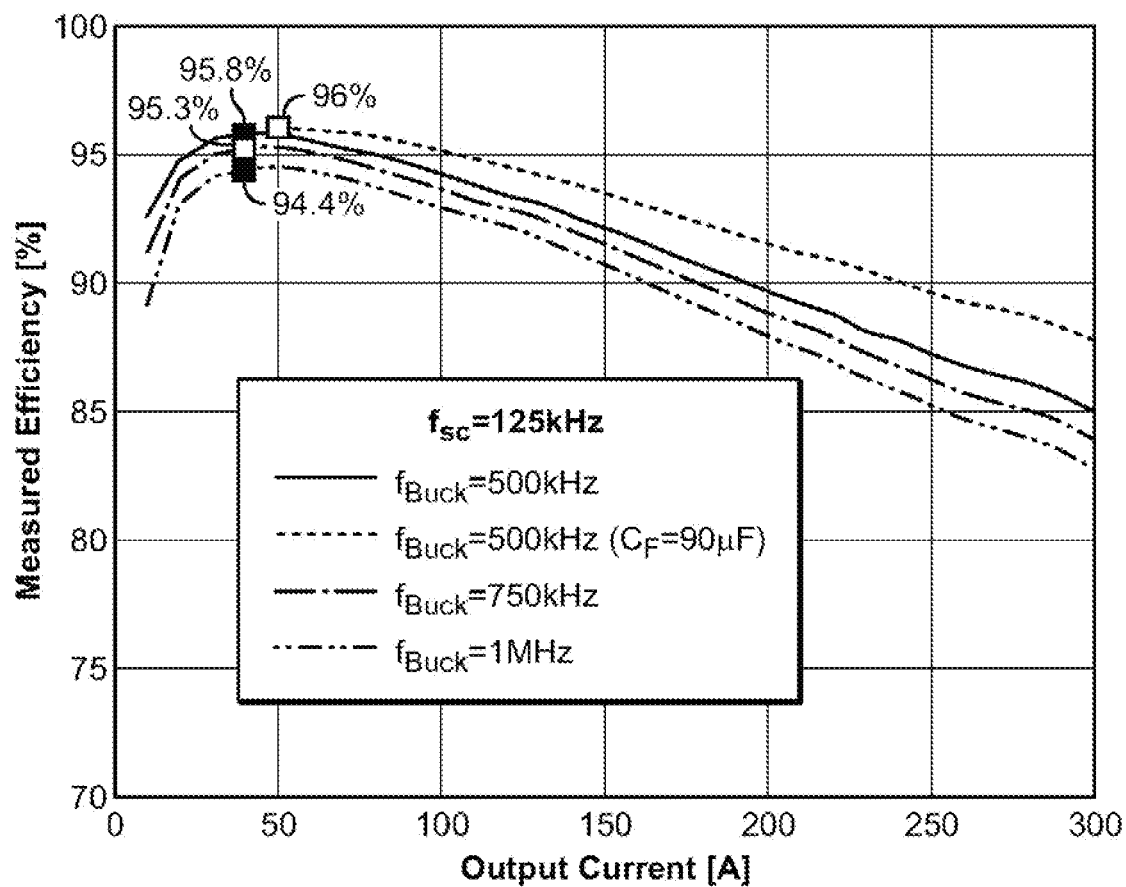
FIG. 29(a) depicts a graph of measured efficiency of the LEGO-PoL prototype where the switched-capacitor frequency is fixed and the buck frequency is swept according to an embodiment of the present invention.
Figure 29B:
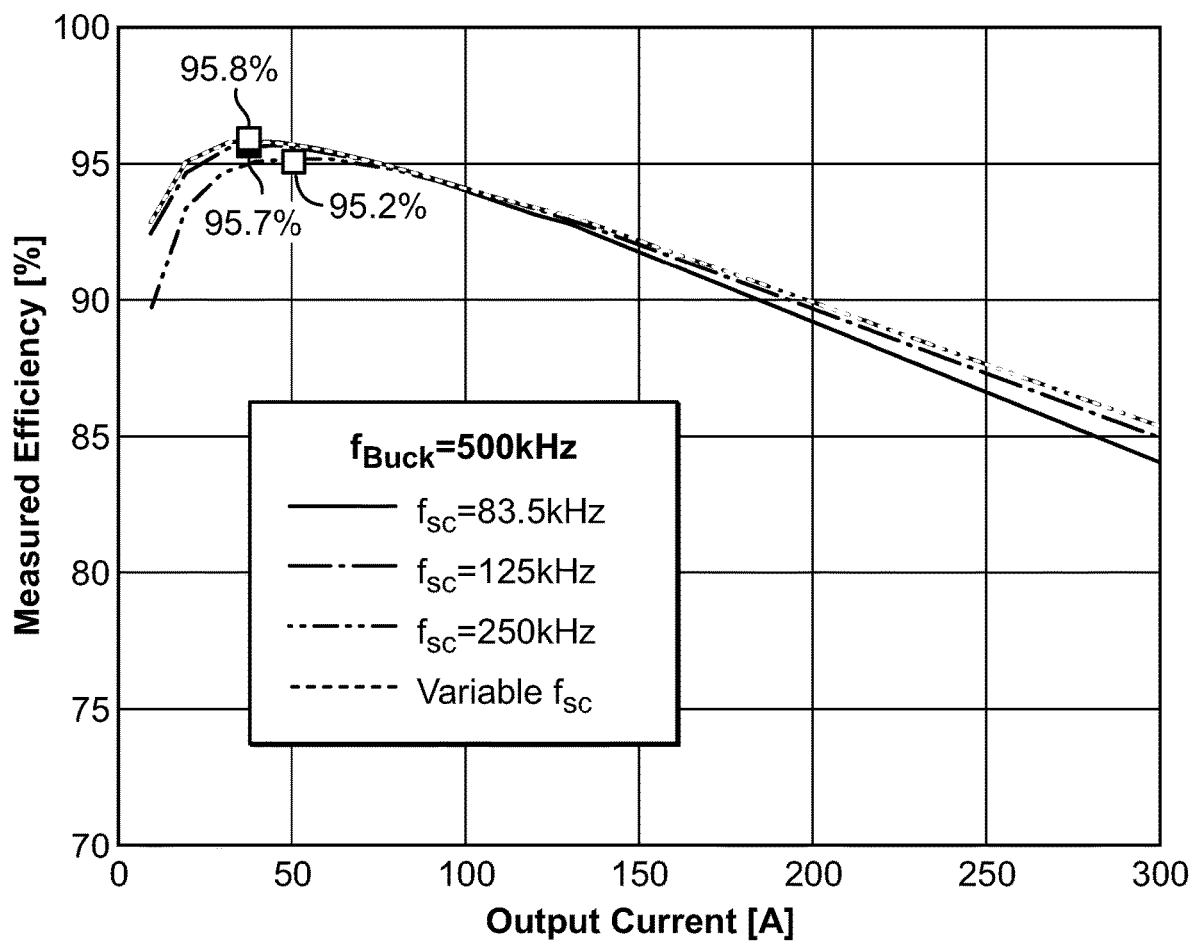
FIG. 29(b) depicts a graph of measured efficiency of the LEGO-PoL prototype where the buck frequency is fixed and the switched-capacitor frequency is swept according to an embodiment of the present invention.

FIGS. 29(a)-(b) show the measured efficiency of the 48V-1.5V 300 A LEGO-PoL system. The buck stage and the switched-capacitor stage are operating at different frequencies. The peak efficiency of the 48V-1.5V system is 95.75% at 40 A, and 85% at 300 A with $f_{Buck}$=500 kHz, and $f_{SC}$=125 kHz. If $C_F$ was increased to 90 µF, the system peak efficiency and full load efficiency would be increased to 96% and 87.7%, respectively. In a traditional hybrid-switched-capacitor design, the switching frequency usually needs to be fixed to maintain resonant operation and maintain soft switching. By modulating the switching frequency, the LEGO-PoL converter can achieve higher performance across a wide operation range. The power density of the prototype is 577 W/in$^3$ (power stage only).

Figure 30A:
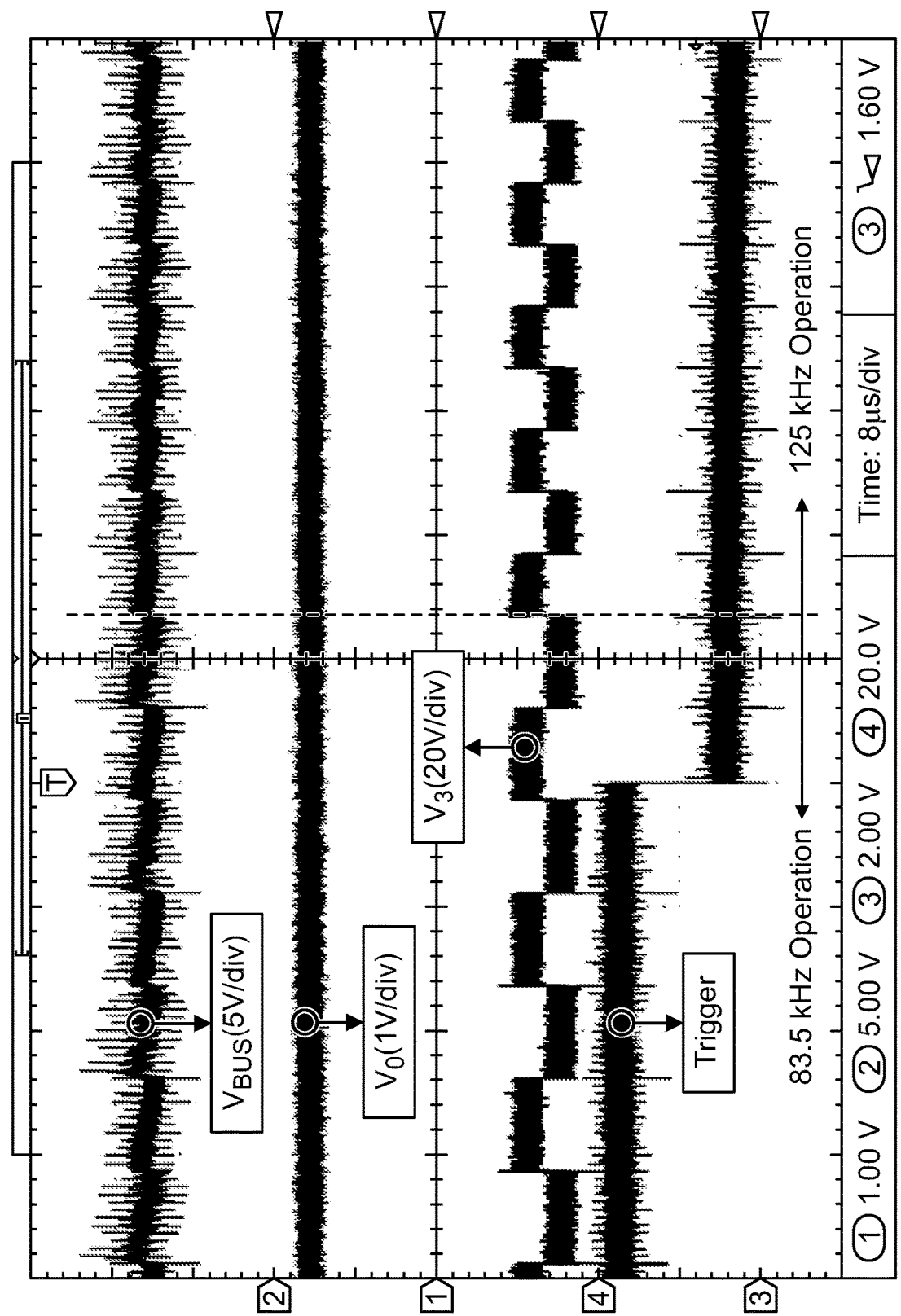
FIG. 30(a) depicts a graph of measured waveforms during a step change of the switched-capacitor frequency from 83.5 kHz to 125 kHz according to an embodiment of the present invention.
Figure 30B:
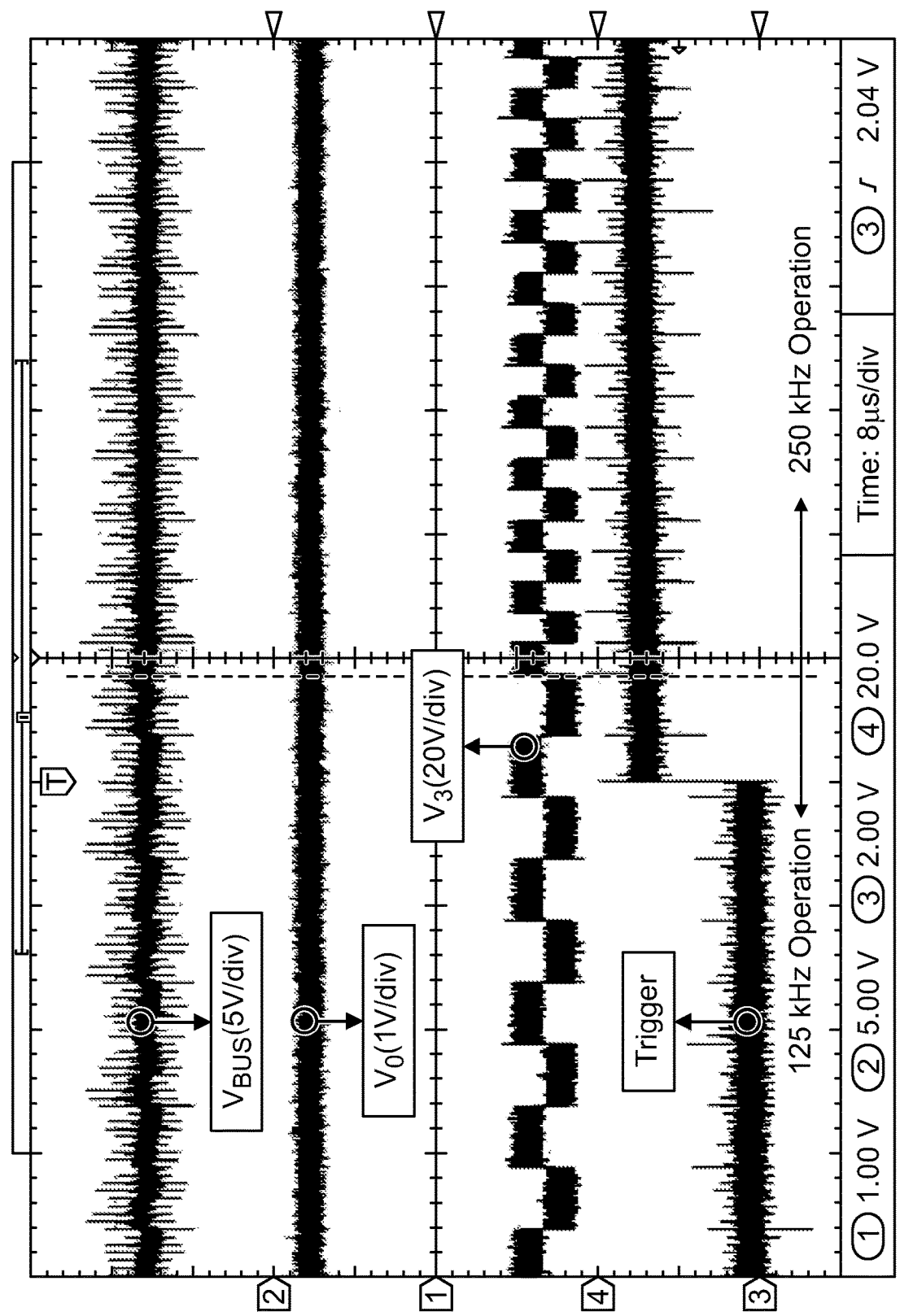
FIG. 30(b) depicts a graph of measured waveforms during a step change of the switched-capacitor frequency from 125 kHz to 250 kHz according to an embodiment of the present invention.

FIGS. 30(a)-(b) show the transient waveforms when the switched-capacitor operating frequency changes. As the switching frequency increases, the ripples in the bus voltage are reduced. The average value of bus voltage and output voltage are well maintained, and the capacitor voltages are well balanced.

Figure 31A:
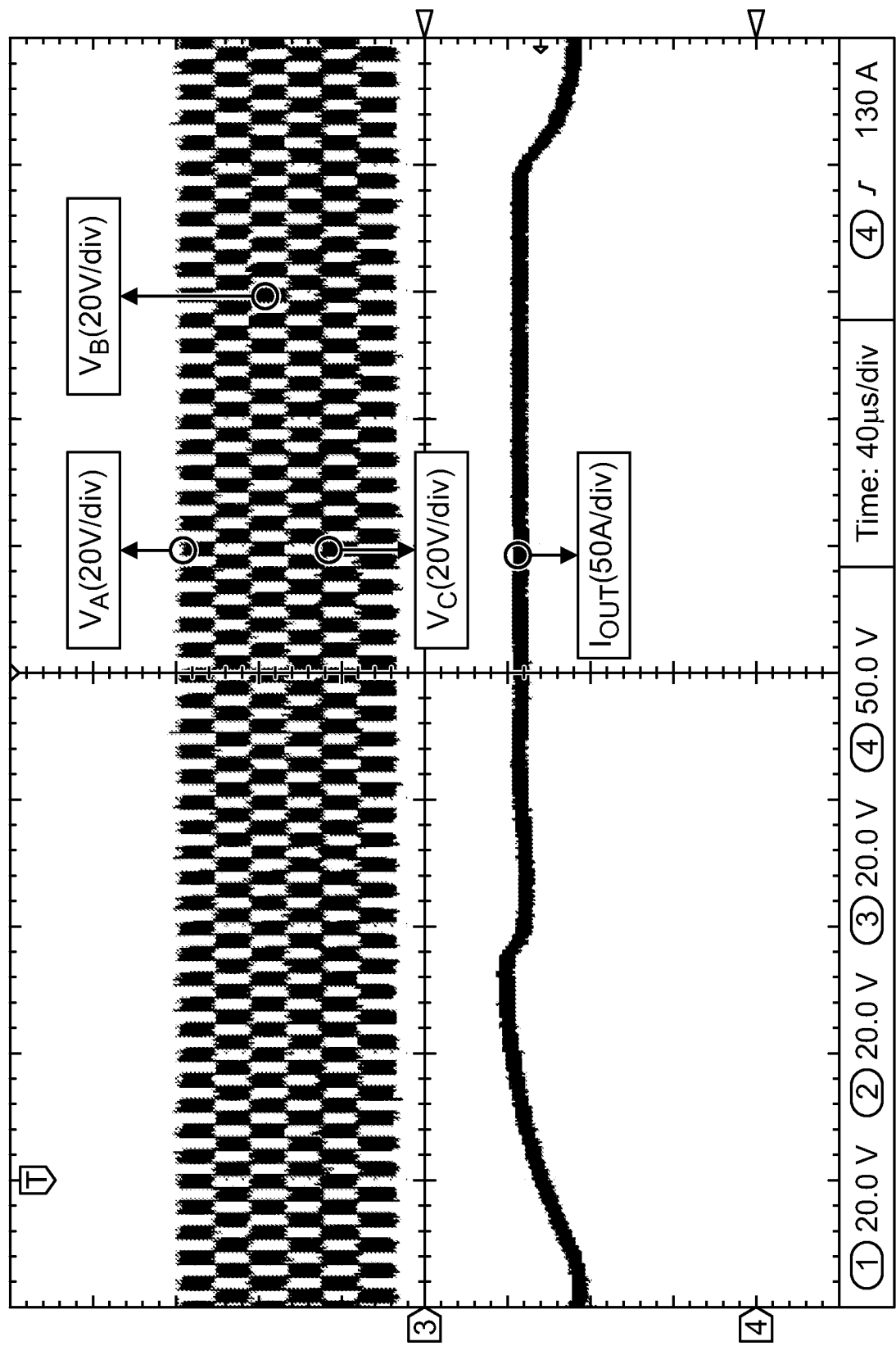
FIG. 31(a) depicts a graph of measured waveforms during a load step transient showing voltages of the switch node in the switched-capacitor units according to an embodiment of the present invention.
Figure 31B:
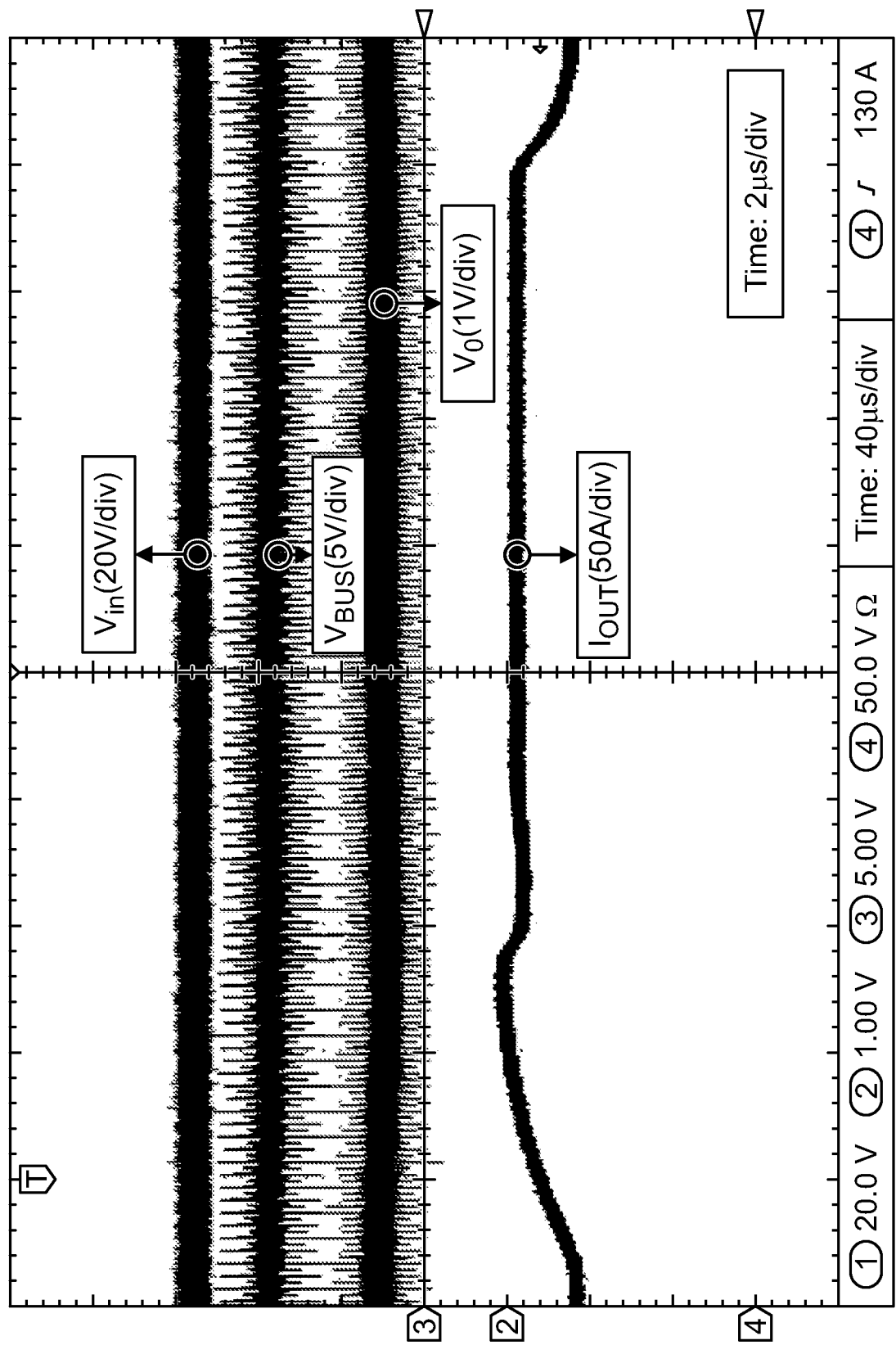
FIG. 31(b) depicts a graph of measured waveforms during a load step transient showing input voltage, bus voltage, and output voltage according to an embodiment of the present invention.

FIGS. 31(a)-(b) show the transient response of the prototype when the load steps between 100 A and 150 A. The voltages of the switch node in the switched-capacitor units ($v_A$, $v_B$, and $v_C$) maintain the same during transient, indicating automatic current sharing and voltage balancing. The intermediate bus voltage ($V_{Bus}$) and output voltage ($V_O$) are also well regulated during the load step change.

As such, generally disclosed herein are embodiments of LEGO-PoL converters with merged-two-stage operation for very high current microprocessors. By merging the operation of the switched-capacitor units and the multi-phase buck units, a LEGO-PoL converter can achieve soft charging and ZCS operation without resonant inductors. The merged-two-stage operation also enables high control bandwidth for voltage regulation while offering high efficiency and high power density. The LEGO-PoL system can be linearly extended by adding more switched-capacitor or multiphase buck building blocks with automatic voltage balancing and current sharing. A 48V-1.5V 300 A CPU power supply was built and tested to verify the effectiveness of the LEGO-PoL architecture. The peak efficiency of the prototype is 96%. The full load efficiency of the system is 87.7%. The power density of the prototype is 577 W/in$^3$.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A power converter circuit comprising:
a plurality of voltage splitting units (VSUs) coupled to a plurality of current splitting units (CSUs), the VSUs being connected to each other in series and the CSUs being connected to each other in parallel, each VSU being directly connected to a CSU without a capacitor in between, the power converter circuit configured to have an intermediate bus voltage ($V_{BUS}$) between each VSU and its directly connected CSU, where the $V_{BUS}$ includes large voltage pulses relative to an average $V_{BUS}$ based on a switching frequency of the VSU;
the VSUs each having a fixed voltage conversion ratio and being operated at a lower frequency than the CSUs; and
the CSUs each having an adjustable voltage conversion ratio and being operated at a higher frequency than the VSUs.

2. The power converter circuit of claim 1 wherein the VSUs each comprise one or more switches, one or more capacitors, and no more than one inductor.

3. The power converter circuit of claim 1 wherein a VSU of the plurality of VSUs comprises at least one of a 1:1 switched capacitor unit, a 1:1 switched tank unit, a 2:1 switched capacitor unit, and a 2:1 switched tank unit.

4. The power converter circuit of claim 1 wherein the CSUs each comprise one or more switches and one or more inductors.

5. The power converter circuit of claim 1 wherein a CSU of the plurality of CSUs comprises at least one of a buck unit, a buck/boost unit, a tapped-inductor derived unit, and a multiphase coupled-inductor buck unit.

6. The power converter circuit of claim 1 wherein the voltage conversion ratio of the CSUs is adjusted by changing a duty ratio of the CSUs.

7. The power converter circuit of claim 1 wherein each VSU is paired with a CSU to form a submodule.

8. The power converter circuit of claim 7 wherein each submodule comprises an input port and an output port, the input ports of the plurality of submodules being connected in series and the output ports of the plurality of submodules being connected in parallel.

9. The power converter circuit of claim 1 further comprising a bottom VSU of the plurality of VSUs, the bottom VSU having an input port and an output port directly connected to each other.

10. The power converter circuit of claim 1 further comprising a bottom VSU of the plurality of VSUs, the bottom VSU having a shorted capacitor.

11. A method of operating a power converter circuit, the power converter circuit including a plurality of voltage splitting units (VSUs) coupled to a plurality of current splitting units (CSUs), the plurality of VSUs coupled to each other in series and the plurality of CSUs coupled to each other in parallel, each VSU being directly connected to a CSU without a capacitor in between, the power converter circuit configured to have an intermediate bus voltage ($V_{BUS}$) between each VSU and its directly connected CSU, where the $V_{BUS}$ includes large voltage pulses relative to an average $V_{BUS}$ based on a switching frequency of the VSU, the method comprising:
controlling the VSUs to each have a fixed voltage conversion ratio and to operate at a lower frequency than the CSUs; and
controlling the CSUs to each have an adjustable voltage conversion ratio and to operate at a higher frequency than the VSUs.

12. The method of claim 11 wherein the VSUs each comprise one or more switches, one or more capacitors, and no more than one inductor.

13. The method of claim 11 wherein a VSU of the plurality of VSUs comprises at least one of a 1:1 switched capacitor unit, a 1:1 switched tank unit, a 2:1 switched capacitor unit, and a 2:1 switched tank unit.

14. The method of claim 11 wherein the CSUs each comprise one or more switches and one or more inductors.

15. The method of claim 11 wherein a CSU of the plurality of CSUs comprises at least one of a buck unit, a buck/boost unit, a tapped-inductor derived unit, and a multiphase coupled-inductor buck unit.

16. The method of claim 11 further comprising adjusting the voltage conversion ratio of the CSUs by changing a duty ratio of the CSUs.

17. The method of claim 11 wherein each VSU is paired with a CSU to form a submodule.

18. The method of claim 17 wherein each submodule comprises an input port and an output port, the input ports of the plurality of submodules being connected in series and the output ports of the plurality of submodules being connected in parallel.

19. The method of claim 11 wherein a bottom VSU of the plurality of VSUs has an input port and an output port directly connected to each other.

20. The method of claim 11 wherein a bottom VSU of the plurality of VSUs has a shorted capacitor.

21. A power converter circuit comprising:
a plurality of voltage splitting units (VSUs) coupled to a plurality of current splitting units (CSUs), the VSUs being connected to each other in series and the CSUs being connected to each other in parallel, each VSU being directly connected to a CSU without a capacitor in between, the power converter circuit configured to have an intermediate bus voltage ($V_{BUS}$) between each VSU and its directly connected CSU, where the $V_{BUS}$ includes-ripples large voltage pulses relative to an average $V_{BUS}$ based on a switching frequency of the VSU; and
a controller configured to:
control the VSUs to each have a fixed voltage conversion ratio and to operate the VSUs at a lower frequency than the CSUs; and
control the CSUs to each have an adjustable voltage conversion ratio and to operate the CSUs at a higher frequency than the VSUs.

22. The power converter circuit of claim 21 wherein the VSUs each comprise one or more switches, one or more capacitors, and no more than one inductor.

23. The power converter circuit of claim 21 wherein a VSU of the plurality of VSUs comprises at least one of a 1:1 switched capacitor unit, a 1:1 switched tank unit, a 2:1 switched capacitor unit, and a 2:1 switched tank unit.

24. The power converter circuit of claim 21 wherein the CSUs each comprise one or more switches and one or more inductors.

25. The power converter circuit of claim 21 wherein a CSU of the plurality of CSUs comprises at least one of a buck unit, a buck/boost unit, a tapped-inductor derived unit, and a multiphase coupled-inductor buck unit.

26. The power converter circuit of claim 21 wherein the controller is further configured to adjust the voltage conversion ratio of the CSUs by changing a duty ratio of the CSUs.

27. The power converter circuit of claim 21 wherein each VSU is paired with a CSU to form a submodule.

28. The power converter circuit of claim 27 wherein each submodule comprises an input port and an output port, the input ports of the plurality of submodules being connected in series and the output ports of the plurality of submodules being connected in parallel.

29. The power converter circuit of claim 21 further comprising a bottom VSU of the plurality of VSUs, the bottom VSU having an input port and an output port directly connected to each other.

30. The power converter circuit of claim 21 further comprising a bottom VSU of the plurality of VSUs, the bottom VSU having a shorted capacitor.

* * * * *